(12) United States Patent
Moya et al.

(10) Patent No.: US 12,378,633 B2
(45) Date of Patent: Aug. 5, 2025

(54) HYDROMETALLURGICAL SOLVENT EXTRACTION METHODS

(71) Applicant: Cytec Industries Inc., Princeton, NJ (US)

(72) Inventors: Luis Moya, Tolleson, AZ (US); Matthew Dean Soderstrom, Mesa, AZ (US); Adam James Fischmann, Victoria (AU); Michael Moser, Fairfield, CT (US); Lei Zhang, Stamford, CT (US)

(73) Assignee: CYTEC INDUSTRIES, INC., Princeton, NJ (US)

( * ) Notice: Subject to any disclaimer, the term of this patent is extended or adjusted under 35 U.S.C. 154(b) by 615 days.

(21) Appl. No.: 16/458,905

(22) Filed: Jul. 1, 2019

(65) Prior Publication Data

US 2020/0048733 A1    Feb. 13, 2020

Related U.S. Application Data

(60) Provisional application No. 62/694,213, filed on Jul. 5, 2018.

(51) Int. Cl.
*C22B 7/00* (2006.01)
*C22B 3/26* (2006.01)

(52) U.S. Cl.
CPC ............... *C22B 7/006* (2013.01); *C22B 3/26* (2021.05)

(58) Field of Classification Search
CPC ......... C22B 7/006; C22B 7/007; C22B 7/008; C22B 7/009; C22B 3/00; C22B 11/00;
(Continued)

(56) References Cited

U.S. PATENT DOCUMENTS 3,719,748 A * 3/1973 Manfroy .................. C02F 1/56
423/544
4,207,302 A    6/1980 Smith
(Continued)

FOREIGN PATENT DOCUMENTS

AU    2015203224 A1 *  7/2015
JP    H01268704 A  * 10/1989  ............ B22F 1/0018

OTHER PUBLICATIONS

Sigma Aldrich, Poly(styrenesulfonic acid sodium salt) Standard 10,000 SDS, 2020 (Year: 2020).*
(Continued)

*Primary Examiner* — Anthony J Zimmer
*Assistant Examiner* — Nikolas Takuya Pullen
(74) *Attorney, Agent, or Firm* — Osha Bergman Watanabe & Burton LLP

(57) ABSTRACT

A hydrometallurgical solvent extraction method includes mixing an aqueous metal ion solution with an organic solution of metal extraction reagent to form a mixture, and allowing the aqueous metal ion solution and organic solution to phase separate from the mixture; wherein prior to mixing the aqueous metal ion solution and the organic solution, a water-soluble or water-dispersible polymer comprising pendant sulfonic acid or sulfonate salt groups selected from the group consisting of sulfonated polystyrene; an addition polymer including at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added to the aqueous metal ion solution, the organic solution, or to both the aqueous metal ion solution and the organic solution. The water-soluble or water-dispersible polymer can also be added simultaneously with or after mixing of the aqueous metal ion solution and the organic solution.

31 Claims, 2 Drawing Sheets

(58) Field of Classification Search
CPC . C22B 11/04; C22B 15/0084; C22B 15/0089;
C22B 17/00; C22B 17/04; C22B 19/00;
C22B 19/20; C22B 19/26; C22B 23/0453;
C22B 25/00; C22B 25/04; C22B 26/00;
C22B 26/10; C22B 26/12; C22B 34/1259;
C22B 34/14; C22B 34/20; C22B 34/22;
C22B 34/30; C22B 34/32; C22B 34/34;
C22B 34/36; C22B 47/0081; C22B 59/00;
C22B 60/0252; C22B 60/026; C22B 3/20;
C22B 3/26; C22B 3/262; C22B 3/28;
C22B 3/282; C22B 3/284; C22B 3/286;
C22B 3/288; C22B 3/30; C22B 3/302;
C22B 3/304; C22B 3/306; C22B 3/32;
C22B 3/322; C22B 3/324; C22B 3/326;
C22B 3/33; C22B 3/34; C22B 3/36;
C22B 3/362; C22B 3/364; C22B 3/37;
C22B 3/38; C22B 3/381; C22B 3/382;
C22B 3/383; C22B 3/384; C22B 3/3842;
C22B 3/3844; C22B 3/3846; C22B 3/385;
C22B 3/386; C22B 3/387; C22B 3/40
See application file for complete search history.

(56) References Cited

U.S. PATENT DOCUMENTS

| | | |
|---|---|---|
| 4,875,935 A | 10/1989 | Gross et al. |
| 5,024,821 A | 6/1991 | Greenshields et al. |
| 5,208,004 A * | 5/1993 | Myerson .............. C22B 19/34 75/724 |
| 5,758,255 A | 5/1998 | Kerr et al. |
| 6,261,341 B1 | 7/2001 | Cifuentes et al. |
| 8,084,140 B2 * | 12/2011 | Goia ..................... C22C 5/06 75/331 |
| 2003/0032683 A1 | 2/2003 | Spalding |
| 2007/0292325 A1 * | 12/2007 | Rojas .................. C22B 3/26 423/139 |
| 2010/0021370 A1 * | 1/2010 | Nagaraj ............... B03D 1/02 252/61 |
| 2011/0005354 A1 | 1/2011 | Bednarski et al. |
| 2013/0228524 A1 * | 9/2013 | Soderstrom ........ B01D 17/047 210/708 |
| 2014/0243464 A1 | 8/2014 | Debord |
| 2015/0060737 A1 * | 3/2015 | Navarro ................ C08K 7/06 252/511 |
| 2017/0335429 A1 * | 11/2017 | Botha ................... C22B 43/00 |
| 2018/0112291 A1 * | 4/2018 | Waller, Jr. ......... C22B 15/0065 |

OTHER PUBLICATIONS

Poly(styrene-co-4-styrene sulfonic acid) data sheet, Polymer Source Inc., May 10, 2017 (Year: 2017).*

G. M. Ritcey "Crud in solvent extraction processing—a review of causes and treatment" Hydrometallurgy (1980) vol. 5, Issues 2-3, pp. 97-107—doi: 10.1016/0304-386X(80)90031-6 (11 pages).

W. A. Thaler "Hydrocarbon-soluble sulfonating reagents. Sulfonation of aromatic polymers in hydrocarbon solution using soluble acyl sulfates" Macromolecules 1983, 16, 4, 623-628—doi: 10.1021/ma00238a026 (6 pages).

* cited by examiner

HYDROMETALLURGICAL SOLVENT EXTRACTION METHODS

CROSS-REFERENCE TO RELATED APPLICATIONS

This application claims priority benefit from U.S. Provisional Application No. 62/694,213, filed Jul. 5, 2018, the entire content of which is incorporated herein by reference.

BACKGROUND OF THE INVENTION

Liquid-liquid extraction technology is commonly employed to recover and concentrate metal ions from aqueous leach liquors that have been used to dissolve the metal ions from their ores. In this process, sometimes referred to as hydrometallurgical solvent extraction, or "SX", an aqueous leach liquor containing metal ions is thoroughly admixed in a mixing device or extraction column with an organic solution of a metal extraction agent. In admixture with the metal ion-containing aqueous leach liquor, the organic solution selectively or preferentially dissolves and thereby extracts metal ions from the aqueous leach liquor. After organic solvent extraction of metal ions has occurred to the extent desired, the organic/aqueous mixture or dispersion is fed to a settling tank or to the settling region of a mixer-settler wherein the metal-laden organic solution extract separates by gravity from the metal ion-depleted aqueous solution. Metal ions can be subsequently recovered from the metal-laden organic solution by reversing the extraction equilibrium (e.g. with a higher concentration of acid) and then recovered in metallic form by, for example, conventional electrowinning processes.

When a hydrometallurgical solvent extraction process is conducted in a continuous manner, it is common to have a third layer of impurities form between the organic and aqueous layers, i.e. at the organic/aqueous interface in the settling tank. The third layer is a solid-stabilized emulsion consisting primarily of the organic extraction solvent with smaller amounts of entrained aqueous liquid, gas, and suspended particulate matter. This third layer is colloquially referred to as "gunk" or "crud" in the hydrometallurgical industry. The terms "solid-stabilized emulsion" and "crud" are used interchangeably herein. The term "crud" is a broadly defined term which includes a wide range of species that can adversely affect liquid-liquid separation processes. Ritcey provides a detailed review in "Crud in Solvent Extraction Processing—A Review of Causes and Treatment", *Hydrometallurgy*, 5 (1980), 97-107.

Since the crud is at least about 50% organic solvent, and since the metal extraction reagent is costly, it is economically important to recover most if not all of the organic phase. Various systems, processes, and equipment for the removal, recovery, treatment, and prevention of crud have been developed. For example, U.S. Pat. No. 9,474,990 discloses a process for recovering organic solvent from crud, and U.S. Pat. Nos. 4,207,302, 5,024,821, 5,758,255, and 6,261,341 disclose methods of preventing crud. However, few of these solutions are actually practiced in the field as most suffer from being labor intensive, i.e., they require physical removal of the crud by an operator, long processing times, and/or costly plant modifications or equipment. Chemical means of preventing crud formation have not been widely successful either. Chemical means typically involve the use of substantial amounts of chemical additives to treat the feed stream. However chemical additives can have adverse effects on the downstream process and solvent extraction efficiency, or simply be uneconomic or inefficient.

Crud is ubiquitous in SX plants. Operations attempt to prevent crud formation by clarification of pregnant leach solutions "PLS" entering the plant and by operating the mixing in the plant in such a way as to minimize entrainment of gas. Clarification can be as simple as allowing particles to settle out by gravity in a holding pond between the leaching and SX process steps. Other clarification techniques include flocculation, coagulation, and the use of pinned bed clarifiers. These processes require costly additional equipment. Another approach to controlling crud is to design the settler to optimize hydrodynamics to minimize crud accumulation. This approach is difficult to apply to existing plants. Another approach is to run the plant in organic continuity, i.e. by controlling the mixing and flow ratios of the aqueous and organic streams so that the dispersion consists of aqueous droplets dispersed in the organic phase. This has the effect of "packing" the crud at the aqueous/organic interface to prevent it from transferring impurities between the extraction and stripping stages. However, this approach does not prevent crud formation. Periodic shutdowns are still required to physically remove the accumulated crud. Another approach is mechanical treatment of the organic phase to physically remove crud, e.g. by centrifugation and/or filtration. These are costly and time-consuming processes that take part of the organic phase out of circulation, thereby reducing plant capacity, and they also require costly equipment.

None of these approaches to mitigation of crud, including clarification—gravity settling, flocculation, coagulation, redesigning settlers to minimize accumulation of crud therein, and physical removal by centrifugation or filtration—address the root cause of crud formation. A hydrometallurgical solvent extraction method that minimizes crud formation in the first place is a highly desirable alternative to all of the aforementioned crud mitigation techniques.

SUMMARY OF THE INVENTION

The invention comprises a hydrometallurgical solvent extraction method with the addition of a low dose of a water-soluble or water-dispersible sulfonated polymer to the aqueous stream to minimize (i.e., reduce) or prevent crud formation, thereby improving the liquid-liquid phase separation step. The water-soluble or water-dispersible sulfonated polymer can be added continuously. This is a simple technical solution to crud formation that can be used in hydrometallurgical solvent extraction plants without substantial equipment cost. By reducing or preventing crud formation, the frequency of shutdowns to remove crud, the likelihood of crud transferring between extraction and stripping stages, and losses of valuable organic solution and metal extractant are all reduced.

In one aspect, the hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein prior to mixing the aqueous metal ion solution and the organic solution, a water-soluble or water-dispersible polymer comprising pendant sulfonic acid or sulfonate salt groups selected from the group consisting of sulfonated polystyrene; an addition polymer including at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added to the aqueous metal ion solution, the organic solution, or to both the aqueous metal ion solution and the organic solution.

In another aspect, a hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein a water-soluble or water-dispersible polymer having pendant sulfonic acid or sulfonate salt groups selected from the group consisting of sulfonated polystyrene; an addition polymer having at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added simultaneously with or after mixing of the aqueous metal ion solution and the organic solution.

In another aspect, a hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein prior to mixing the aqueous metal ion solution and the organic solution, a sulfonated polystyrene or salt thereof having 65 to 95 mol % sulfonation, based on the moles of styrene repeat units, a number-average molecular weight of 500 to 10,000 g/mol and a polydispersity of 1 to 3, as measured by size exclusion chromatography against 100% sulfonated polystyrene standards, is added to the aqueous metal ion solution.

This summary of the invention may not list all necessary characteristics, and, therefore, sub-combinations of these characteristics or elements may also constitute an invention. These and other objects, features and advantages of this invention will become apparent from the following detailed description of the various aspects of the invention taken in conjunction with the accompanying Examples and Drawings.

BRIEF DESCRIPTION OF THE DRAWINGS

Referring Now to the Drawings.

DETAILED DESCRIPTION OF THE INVENTION

Figure 1:
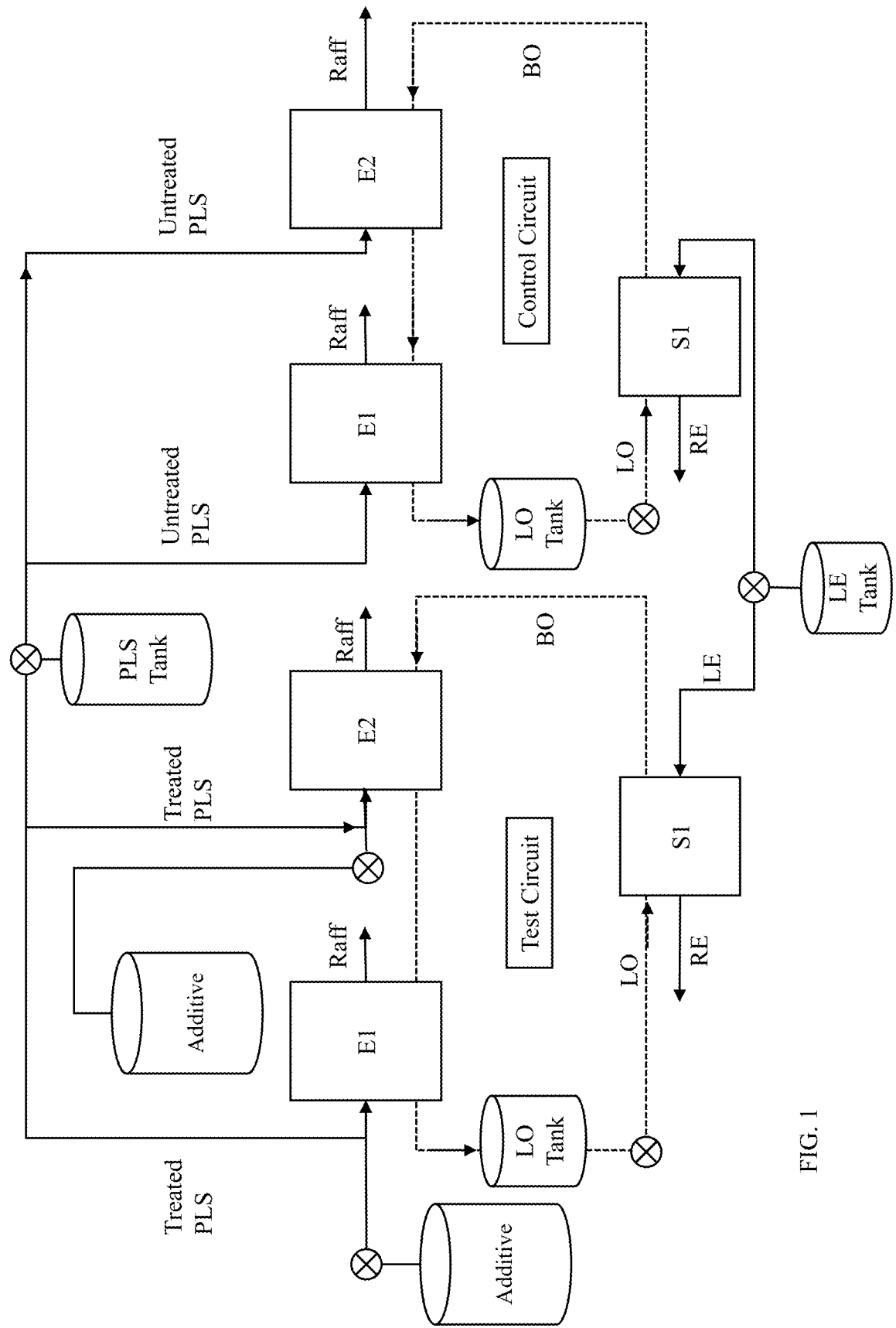
FIG. 1 is a schematic representation of pilot-scale solvent extraction test and control circuits which were set up on-site at a North American solvent extraction operation.

The present inventors have developed an improved hydrometallurgical solvent extraction method which can reduce or prevent crud formation in the hydrometallurgical solvent extraction process. The hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein prior to mixing the aqueous metal ion solution and the organic solution, a water-soluble or water-dispersible polymer comprising pendant sulfonic acid or sulfonate salt groups selected from the group consisting of sulfonated polystyrene; an addition polymer including at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added to the aqueous metal ion solution, the organic solution, or to both the aqueous metal ion solution and the organic solution.

Adding the water-soluble or water-dispersible polymer having pendant sulfonic acid or sulfonate salt groups to the aqueous metal ion solution and/or the organic solution was found to result in reduced crud formation. The reduction in crud formation provides many ancillary benefits: reduced overall impurity transfer (and therefore reduced bleed flow from the electrolyte) due to reduced crud transfer and entrainment; lower crud treatment and processing costs; no need to reduce pregnant leach solution (PLS) flow during times when solids content of the PLS is high, thereby allowing higher metal production than if flow was reduced; less downtime due to solid movement through the solvent extraction (SX) circuit; and overall lower operating cost due to less organic losses through crud entrainment and treatment. It is desirable to add the water-soluble or water-dispersible polymer to the aqueous metal ion solution, based on its water-solubility or water-dispersibility. Therefore, in any or all embodiments according to the invention, the water-soluble or water-dispersible polymer having pendant sulfonic acid or sulfonate salt groups can be added to the aqueous metal ion solution.

In another aspect, the a water-soluble or water-dispersible polymer having pendant sulfonic acid or sulfonate salt groups is added simultaneously with or after mixing of the aqueous metal ion solution and the organic solution. Thus, a hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein a water-soluble or water-dispersible polymer having pendant sulfonic acid or sulfonate salt groups selected from the group consisting of sulfonated polystyrene; an addition polymer having at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added simultaneously with or after mixing of the aqueous metal ion solution and the organic solution.

The method of the present invention is applicable to any hydrometallurgical solvent extraction process wherein a solid-stabilized emulsion, i.e., crud layer, forms at the organic/aqueous interface. One embodiment of a hydrometallurgical solvent extraction process is liquid-liquid solvent extraction of metal ions from aqueous leach liquors. A crud interface usually occurs in settling tanks, although solid-stabilized emulsions can occur at any point in a SX circuit. Pregnant leach solutions containing dissolved metal ions are mixed with an organic solution of a metal extraction reagent dissolved in an organic solvent in a mixing vessel or extraction column to form a dispersion or emulsion. The metal extraction reagent is capable of binding with metal ions and transferring the metal ions from the aqueous solution to the organic solution. Therefore, metal ions are extracted from the pregnant leach solution by the organic solution of metal extraction reagent. After liquid-liquid extraction in the mixing vessel or extraction column, the resulting aqueous/organic solvent dispersion is transferred to a settling tank or to the settling region of a mixer-settler, where the dispersion of aqueous metal ion solution and organic solution are allowed to phase separate. Before extraction of metal ions from the pregnant leach solution, the organic solution is relatively poor in metal ion, and is therefore termed a "barren organic solution". After extraction of metal ions from the pregnant leach solution, the organic solution is relatively rich in metal ion, and is therefore termed a "loaded organic solution". After extraction with the organic solution, the pregnant leach solution, which is relatively rich in metal ion, becomes a "raffinate", which is relatively poor in metal ion. Therefore, in any or all embodiments according to the invention, the aqueous metal ion solution can be a pregnant leach solution, the organic solution can be a partially loaded or barren organic solution, and the pregnant leach solution can be extracted with the partially loaded or barren organic solution to generate a raffinate and a loaded organic solution.

The aqueous leach liquors employed are conventional leaching solutions known to those of ordinary skill in the art. They serve to dissolve metal ions from ores, ore concentrates, mine wastes, scrap metals, or any other source of metal ions. Such aqueous leach liquors can include, for example, acid or ammoniacal solutions. After dissolving metal ions, the aqueous leach liquor is called a pregnant leach liquor, or pregnant leach solution, herein abbreviated as PLS. A raffinate can be recycled, i.e., it can be used as an aqueous leach liquor, or added to an aqueous leach liquor. Thus, in any or all embodiments according to the invention, the aqueous metal ion solution can be a recycled raffinate solution which has been separated from the organic solution.

Another embodiment of a hydrometallurgical solvent extraction method is liquid-liquid aqueous extraction of metal ions from organic solution. In this embodiment, a loaded organic solution, obtained by organic solution extraction of a pregnant leach solution and rich in metal ion, is extracted with a lean aqueous electrolyte solution, which is relatively poor in metal ion, to generate a rich aqueous electrolyte solution, which is rich in metal ion. Thus, in any or all embodiments according to the invention, the aqueous metal ion solution is a lean aqueous electrolyte solution, and a loaded organic solution is stripped with the lean aqueous electrolyte solution to generate a rich aqueous electrolyte solution and a barren organic solution. A solid-stabilized emulsion, or crud layer, can form at the organic/aqueous interface in this liquid-liquid extraction process as well. Zero-valent metal is obtained from the rich aqueous electrolyte solution by an electrochemical process called electrowinning, which is well known in the art.

In the hydrometallurgical extraction process, the mixing of the aqueous metal ion solution and organic solution results in the formation of an unstable emulsion of one of the aqueous metal ion solution or the organic solution dispersed as liquid droplets in the other solution, which forms a continuous phase. Thus, in any or all embodiments according to the invention, the aqueous metal ion solution and organic solution can be mixed in aqueous continuity, which means that the organic solution is dispersed as droplets in the aqueous metal ion solution, which forms the continuous phase. Alternatively, in any or all embodiments according to the invention, the aqueous metal ion solution and organic solution are mixed in organic continuity, which means that the aqueous metal ion solution is dispersed as droplets in the organic solution, which forms the continuous phase. The individual characteristics of the specific aqueous metal ion solution and organic solution used in each solvent extraction process will determine which mode, organic continuity or aqueous continuity, gives better results.

The terms "crud" and "crud layer" interchangeably refer to any solid-stabilized emulsion that occurs at the interface of the aqueous metal ion solution and organic solution layers after mixing and settling. Crud can range from a thick jelly-like consistency to a solid. "Crud" is variously referred to as "third phase impurity", "dispersion", "emulsified suspension", "interfacial sludge", or "gunk" by skilled persons in the art. Crud can form at the interface, surface, and/or bottom of the aqueous metal ion solution and organic solution layers. As mentioned above, crud consists primarily of organic solvent, along with smaller amounts of entrained aqueous metal ion solution, gas, and suspended particulates. The crud frequently contains valuable metal extraction reagent as well. Crud can comprise about 80 parts to 96 parts by weight of organic solution, about 2 parts to 20 parts by weight of aqueous metal ion solution, and about 2 parts to 10 parts by weight of particulates, specifically about 90 parts to 95 parts by weight organic solution, about 5 parts to 10 parts by weight aqueous metal ion solution, and about 2 parts to 4 parts by weight particulates. The particulates can contain a siliceous residue from the leaching of the source material for the metal ions, for example an ore. The particulates can also contain other minerals extracted from the source material by the leach liquor, e.g., gypsum, limestone, mica, china clay, jarosite, α-quartz, and combinations thereof. The particulates can contain insoluble decayed biological matter as well. The particulates can also contain solids that precipitate during the SX process e.g., gypsum and hydroxides, as well as flocculated aggregates of particles from upstream processes.

A method according to the invention includes adding a water-soluble or water-dispersible polymer having pendant sulfonic acid or sulfonate salt groups to an aqueous metal ion solution, an organic solution, or to both the aqueous metal ion solution, the organic solution, or to both the aqueous metal ion solution and the organic solution. As defined herein, a "polymer" is composed of at least two monomer repeat units, at least one of which is sulfonated. For example, a dimer of sodium styrene sulfonate is a polymer as defined herein. Moreover, as used herein, "water-soluble or water-dispersible polymer" is shorthand for "water-soluble or water-dispersible polymer having pendant sulfonic acid or sulfonate salt groups". The water-soluble or water-dispersible polymer can include sulfonated natural polymers, such as sulfonated lignin, lignosulfonates, sulfonated starch, sulfonated cellulose, sulfonated guar, or sulfonated xanthan. The water-soluble or water-dispersible polymer can also include sulfonated synthetic polymers, such as sulfonated melamine-formaldehyde resins, sulfonated butadiene homopolymers and copolymers, and sulfonated styrene homopolymers and copolymers.

The water-soluble or water-dispersible polymer can also include homopolymers and copolymers comprising repeat units of a sulfonated monomer. The sulfonated monomer can be, for example, acrylamido-2-methylpropane sulfonic acid (AMPS), styrene sulfonic acid, allyl sulfonic acid, sulfoethyl (meth)acrylic acid, sulfoethyl (meth)acrylamide, sulfonated vinyl alcohol, sulfonated acrylamide, sulfomethylated acrylamide, sulfomethylated methacrylamide, allyl sulfonic acid, and salts thereof. Copolymers comprising a sulfonated monomer can further include non-sulfonated monomers selected from, but not limited to, (meth)acrylamide, N-mono- or N,N-disubstituted (meth)acrylamides, wherein the substituents are $C_1$-$C_{20}$ saturated or unsaturated hydrocarbyl groups optionally substituted, (meth)acrylic acid and salts thereof, styrene, (meth)acrylic acid esters comprising a $C_1$-$C_{20}$ saturated or unsaturated hydrocarbyl group optionally substituted, maleic anhydride, maleic acid or salts thereof, optionally substituted olefins such as ethylene, propylene, butylene, butadiene, and cyclopentadiene, and mixtures including one or more of the foregoing non-sulfonated monomers. The copolymer comprising repeat units of a sulfonated monomer can also include copolymers of styrene sulfonic acid and styrene, styrene sulfonic acid and acrylamide, ally sulfonic acid and maleic acid, acrylamido-2-methylpropane sulfonic acid and styrene, acrylamido-2-methylpropane sulfonic acid and acrylamide, sulfonated butadiene and styrene, sulfomethyl acrylamide and acrylic acid, or sulfoethyl acrylate and acrylic acid.

The water-dispersible or water-soluble polymer can include sulfonic acid or ionized sulfonic acid, i.e., sulfonate salt, groups. In the sulfonate salts, the cation can include Group I metal ions (for example, $Li^+$, $Na^+$, $K^+$, or $Cs^+$), Group II metal ions (for example $Mg^{2+}$ or $Ca^{2+}$), or ammonium cations represented by the formula $^+N^1R^1R^2R^3R^4$ wherein $R^1$, $R^2$, $R^3$, and $R^4$ are each independently selected from H and $C_1$-$C_{20}$ saturated or unsaturated hydrocarbyl groups, optionally substituted.

In any or all embodiments according to the invention, the amount of water-soluble or water-dispersible polymer having pendant sulfonic acid or sulfonate salt groups can be 0.01 to 1,000 milligrams per liter (mg/L) of aqueous metal ion solution. Within this range, the effective amount of water-soluble or water-dispersible polymer can be 0.05 to 100, 0.1 or 50, or 1 to 20 mg/L.

In any or all embodiments according to the invention, the water-soluble or water-dispersible polymer having pendant sulfonic acid or sulfonate salt groups can include sulfonated polystyrene, (herein referred to as "SPS") with a degree of sulfonation of 1 to 100 mol %, based on the moles of styrene repeat units, salts thereof, or a combination comprising at least one of the foregoing sulfonated polystyrenes. Within this range, the degree of sulfonation can be greater than or equal to 10, 20, 30, 40, 50, 60, 65, 70, 75, 80, 85, or 90 mol % and less than or equal to 95, 90, 85, 80, 75, 70, 65, or 60 mol %. For example, the degree of sulfonation can be 50 to 100, 65 to 95, 75 to 88, or 70 to 80 mol %. In any or all embodiments according to the invention, the water-soluble or water-dispersible polymer can be a sulfonated polystyrene or salt thereof having 65 to 95 mol % sulfonation, based on the moles of styrene repeat units.

An upper limit on the molecular weight of the water-dispersible or water-soluble polymer comprising pendant sulfonic acid or sulfonate salt groups can be determined for each individual polymer by a number of factors, for example the maximum molecular weight in which the polymer remains water-dispersible or water-soluble, the maximum molecular weight at which an aqueous solution of the polymer is not excessively viscous at end-use concentrations, or the maximum molecular weight at which the polymer is still effective for reducing crud formation. In any or all embodiments according to the invention, when the water-dispersible or water-soluble polymer comprising pendant sulfonic acid or sulfonate salt groups is sulfonated polystyrene or salt thereof, the number-average molecular weight can be 300 to 100,000 g/mol, as measured by size exclusion chromatography against 100% sulfonated polystyrene standards. Within this range, the number-average molecular weight of the sulfonated polystyrene or salt thereof can be 500 to 10,000 g/mol. In the same or other embodiments, the polydispersity ($M_w/M_n$) of the sulfonated polystyrene or salt thereof can be 1 to 5, specifically 1 to 3.

In any or all embodiments according to the invention, a hydrometallurgical solvent extraction method includes mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein prior to mixing the aqueous metal ion solution and the organic solution, a sulfonated polystyrene or salt thereof having 65 to 95 mol % sulfonation, based on the moles of styrene repeat units, a number-average molecular weight of 500 to 10,000 g/mol and a polydispersity of 1 to 3, as measured by size exclusion chromatography against 100% sulfonated polystyrene standards, is added to the aqueous metal ion solution.

The water-soluble or water-dispersible polymer having pendant sulfonic acid or sulfonate salt groups can be an addition polymer of a sulfonated ethylenically unsaturated monomer and optionally at least one other ethylenically unsaturated monomer. Thus, in any or all embodiments according to the invention, the water-soluble or water-dispersible polymer having pendant sulfonic acid or sulfonate salt groups is selected from the group consisting of poly(styrene-4-sulfonic acid); poly(2-acrylamido-2-methylpropane sulfonic acid); copolymers of 2-acrylamido-2-methylpropane sulfonic acid and acrylamide; copolymers of styrene-4-sulfonic acid and acrylamide; copolymers of styrene and 2-acrylamido-2-methylpropane sulfonic acid, wherein the amount of 2-acrylamido-2-methylpropane sulfonic acid is greater than or equal to 20 mole %; salts thereof; and mixtures thereof.

In any or all embodiments according to the invention, the addition polymer can be a homopolymer of a sulfonated ethylenically unsaturated monomer. For example, the addition polymer of a sulfonated ethylenically unsaturated monomer can be poly(styrene-4-sulfonic acid), salts thereof, or mixtures thereof. The addition polymer of a sulfonated ethylenically unsaturated monomer can also be poly(2-acrylamido-2-methylpropane sulfonic acid), salts thereof, or mixtures thereof.

In any or all embodiments according to the invention, the addition polymer can be a copolymer of a sulfonated ethylenically unsaturated monomer and at least one other ethylenically unsaturated monomer. For example, the addition polymer can be a copolymer of 2-acrylamido-2-methylpropane sulfonic acid (AMPS) and acrylamide (AMD), salts thereof, or mixtures thereof. The molar ratio of AMPS: AMD in the copolymer can be from 30:70 to 90:10, or from 50:50 to 90:10. The addition polymer of a sulfonated ethylenically unsaturated monomer and at least one other ethylenically unsaturated monomer can also be a copolymer of 2-acrylamido-2-methylpropane sulfonic acid (AMPS) and styrene, salts thereof, or mixtures thereof. The molar ratio of AMPS in the copolymer can be greater than 40%, or greater than 60%. The addition polymer of a sulfonated ethylenically unsaturated monomer and at least one other ethylenically unsaturated monomer can also be copolymers of styrene-4-sulfonic acid (SS) and acrylamide (AMD), salts thereof, or mixtures thereof. The molar ratio of SS:AMD in the copolymer can be from 30:70 to 90:10, or from 60:40 to 80:20.

The water-soluble or water-dispersible polymer having pendant sulfonic acid or sulfonate salt groups is not limited to addition polymers. Thus, in any or all embodiments according to the invention, the water-soluble or water-dispersible polymer having pendant sulfonic acid or sulfonate salt groups can be naphthalene sulfonic acid-formaldehyde condensate, salts thereof, or mixtures thereof. The water-soluble or water-dispersible polymer having pendant sulfonic acid or sulfonate salt groups can also be lignosulfonate, salts thereof, or mixtures thereof.

The metal extraction reagent is dissolved in an organic solvent to form an organic solution. The organic solvent can be any fluid organic solvent or mixture of solvents, which is a good solvent for the metal extraction reagent, which is immiscible with water, which is unreactive toward other components under the solvent extraction conditions, and which is low cost. Suitable organic solvents include, for example, hydrocarbon solvents having a low aromatics content, e.g. an aromatics content of less than 30 wt. %, less than 23 wt. %, less than 5 wt. %, or less than 1 wt. %. In any or all embodiments according to the invention, the metal extraction reagent can be dissolved in an organic solvent to form the organic solution, wherein the organic solvent comprises aromatic paraffins, aliphatic paraffins, naphthas, or a combination comprising at least one of the foregoing organic solvents. Examples of commercially available metallurgical-grade organic solvents include the ORFOM™ SX series of solvent extraction diluents (available from Chevron Phillips Chemical LLC, The Woodlands, Tex.); any of the ISOPAR™, NORPAR™, and ESCAID™, 100, 110, and 120 series of solvents (available from ExxonMobil, Houston, Tex.); any of the SSX™ series of liquid paraffins (available from Sasol Wax, Hayward, Calif.); or any other organic solvents from various petroleum and kerosene fractions.

Suitable metal extraction reagents are well known to those skilled in the art and include, for example, those that selectively complex with or solvate one particular species of metal ion so that pregnant leach solutions containing several metal ion species can be treated to separate the desired metal ion therefrom. The literature is replete with examples of metallurgical solvent extraction circuits and processes for recovery of specific metal ions. Suitable metal extraction reagents include, for example, ortho-hydroxyarylaldoximes, ortho-hydroxyarylketoximes, phosphine oxides, phosphinic acids, dialkyldithiophosphinic acids, alkyl phosphonic acids, trialkyl phosphate esters, alkyl amines, carboxylic acids, alcohols, ethers, ketones, and heterocyclic compounds. The metal extraction reagent can be, for example, a 5-($C_8$-$C_{14}$ alkyl)-2-hydroxybenzaldoxime and/or 5-($C_8$-$C_{14}$ alkyl)-2-hydroxyacetophenone oxime. A useful commercial example of a metal extraction reagent is ACORGA™ M5910/M5774, which is 2-hydroxy-5-nonyl benzaldehyde oxime, branched (CAS No. 174333-80-3), available from Solvay. The metal extraction reagents can also include additives such as, but not limited to, equilibrium modifiers, selectivity modifiers, anti-degradation agents, and a combination comprising at least one of the foregoing additives.

Hydrometallurgical solvent extraction is applicable to any metal that can form a water-soluble metal ion. The metal ion can be a metal oxide ion or metal-ligand complex ion. When the metal ion has commercial value, it is termed a "metal value". Thus, in any or all embodiments according to the invention, the metal ion can comprise copper, cadmium, chromium, cobalt, molybdenum, nickel, tin, vanadium, zinc, lithium, gold, platinum group metals, actinides, rare earth elements, or a combination of metal ions comprising at least one of the foregoing metal ions. Hydrometallurgical solvent extraction can be used for the extraction of actinides, for example uranium, for use in nuclear fuel, or for extraction of actinides from nuclear waste. Hydrometallurgical solvent extraction can also be used to remove impurity metals from ore. Examples of impurity metals that often accompany more valuable metals in ores are iron, magnesium, and manganese.

Another aspect of the invention includes methods for improving the liquid-liquid separation step in a hydrometallurgical solvent extraction process by adding an effective amount of a water-soluble or water-dispersible polymer comprising pendant sulfonic acid or sulfonate salt groups to an aqueous metal ion solution; mixing the aqueous metal ion solution with an organic solution of metal extraction reagent capable of binding with metal ions and transferring the metal ions from the aqueous solution to the organic solution, to form a mixture; and allowing the aqueous metal ion solution and organic solution to phase separate from the mixture. An example of such an improvement in the liquid-liquid separation step of the hydrometallurgical process includes reducing or preventing solid-stabilized emulsion formation. Thus, in any or all embodiments according to the invention, an effective amount of the water-soluble or water-dispersible polymer comprising pendant sulfonic acid or sulfonate salt groups is the amount required to reduce or prevent solid-stabilized emulsion formation compared to the aqueous metal ion solution without addition of the water-soluble or water-dispersible polymer. In any or all embodiments according to the invention, the effective amount of water-soluble or water-dispersible polymer having sulfonic acid or sulfonate salt groups to reduce or prevent crud formation is 0.01 to 1,000 milligrams per liter (mg/L) of aqueous metal ion solution. Within this range, the effective amount of water-soluble or water-dispersible polymer can be 0.05 to 100, 0.1 or 50, or 1 to 20 mg/L. The reduction in solid-stabilized emulsion formation can be measured by the depth of the solid-stabilized emulsion layer. Specific procedures for determining reduction in solid-stabilized emulsion, and measuring the depth of the solid-stabilized emulsion layer are provided in Example 2 (bench-scale stir test), in Examples 4-5 (lab-scale continuous tests), and Examples 6-7 (on-site pilot-scale continuous tests).

Another example of improvement in the liquid-liquid separation step of the hydrometallurgical process includes reducing or preventing organic solution entrainment in the aqueous metal ion solution. Thus, in some embodiments, an effective amount of the water-soluble or water-dispersible polymer comprising pendant sulfonic acid or sulfonate salt groups is the amount required to reduce organic solution entrainment in the aqueous metal ion solution compared to the same method without addition of the water-soluble or water-dispersible polymer. In any or all embodiments according to the invention, the effective amount of water-soluble or water-dispersible polymer having sulfonic acid or sulfonate salt groups to reduce or prevent organic solution entrainment in the aqueous metal ion solution is 0.01 to 1,000 milligrams per liter (mg/L) of aqueous metal ion solution. Within this range, the effective amount of water-soluble or water-dispersible polymer can be 0.05 to 100, 0.1 or 50, or 1 to 20 mg/L.

A specific procedure for determining reduction in organic solution entrainment in the aqueous metal ion solution is provided in Example 7 (on-site pilot-scale continuous test). The results showing this improvement in Example 7 are provided in Table 16.

The invention includes at least the following embodiments.

Embodiment 1

A hydrometallurgical solvent extraction method, the method comprising mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein prior to mixing the aqueous metal ion solution and the organic solution, a water-soluble or water-dispersible polymer comprising pendant sulfonic acid or sulfonate salt groups selected from the group consisting of sulfonated polystyrene; an addition polymer comprising at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added to the aqueous metal ion solution, the organic solution, or to both the aqueous metal ion solution and the organic solution.

Embodiment 2

The method of embodiment 1, wherein the water-soluble or water-dispersible polymer comprising pendant sulfonic acid or sulfonate salt groups is added to the aqueous metal ion solution.

Embodiment 3

A hydrometallurgical solvent extraction method, the method comprising mixing an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; wherein a water-soluble or water-dispersible polymer comprising pendant sulfonic acid or sulfonate salt groups selected from the group consisting of sulfonated polystyrene; an addition polymer comprising at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added simultaneously with or after mixing of the aqueous metal ion solution and the organic solution.

Embodiment 4

The method of any of embodiments 1 to 3, wherein the aqueous metal ion solution is a pregnant leach solution, the organic solution is a partially loaded or barren organic solution, and the pregnant leach solution is extracted with the partially loaded or barren organic solution to generate a raffinate and a loaded organic solution.

Embodiment 5

The method of any of embodiments 1 to 3, wherein the aqueous metal ion solution is a recycled raffinate solution which has been separated from the organic solution.

Embodiment 6

The method of any of embodiments 1 to 3, wherein the aqueous metal ion solution is a lean aqueous electrolyte solution, and a loaded organic solution is stripped with the lean aqueous electrolyte solution to generate a rich aqueous electrolyte solution and a barren organic solution.

Embodiment 7

The method of any of embodiments 1 to 6, wherein the metal extraction reagent is dissolved in an organic solvent to form the organic solution, wherein the organic solvent comprises aromatic paraffins, aliphatic paraffins, naphthas, or a combination comprising at least one of the foregoing organic solvents.

Embodiment 8

The method of any of embodiments 1 to 7, wherein the water-soluble or water-dispersible polymer comprising pendant sulfonic acid or sulfonate salt groups comprises a sulfonated polystyrene with a degree of sulfonation of 1 to 100 mol %, based on the moles of styrene repeat units, salts thereof, or a combination comprising at least one of the foregoing water-soluble or water-dispersible polymers.

Embodiment 9

The method of embodiment 8, wherein the water-soluble or water-dispersible polymer is a sulfonated polystyrene or salt thereof having 65 to 95 mol % sulfonation, based on the moles of styrene repeat units.

Embodiment 10

The method of embodiment 8 or 9, wherein the sulfonated polystyrene or salt thereof has a number-average molecular weight of 300 to 100,000 g/mol and a polydispersity of 1 to 3, as measured by size exclusion chromatography against 100% sulfonated polystyrene standards.

Embodiment 11

The method of embodiment 10, wherein the sulfonated polystyrene or salt thereof has a number-average molecular weight of 500 to 10,000 g/mol, as measured by size exclusion chromatography against 100% sulfonated polystyrene standards.

Embodiment 12

The method of any of embodiments 1 to 7, wherein the water-soluble or water-dispersible polymer comprising pendant sulfonic acid or sulfonate salt groups is selected from the group consisting of poly(styrene-4-sulfonic acid); poly (2-acrylamido-2-methylpropane sulfonic acid); copolymers of 2-acrylamido-2-methylpropane sulfonic acid and acrylamide; copolymers of styrene-4-sulfonic acid and acrylamide; copolymers of styrene and 2-acrylamido-2-methylpropane sulfonic acid, wherein the amount of 2-acrylamido-2-methylpropane sulfonic acid is greater than or equal to 20 mole %; salts thereof; and mixtures thereof.

Embodiment 13

The method of embodiment 12, wherein the water-soluble or water-dispersible polymer comprising pendant sulfonic acid or sulfonate salt groups comprises poly(styrene-4-sulfonic acid), salts thereof, or mixtures thereof.

Embodiment 14

The method of embodiment 12, wherein the water-soluble or water-dispersible polymer comprising pendant sulfonic acid or sulfonate salt groups comprises poly(2-acrylamido-2-methylpropane sulfonic acid), salts thereof, or mixtures thereof.

Embodiment 15

The method of embodiment 12, wherein the water-soluble or water-dispersible polymer comprising pendant sulfonic acid or sulfonate salt groups comprises copolymers of 2-acrylamido-2-methylpropane sulfonic acid (AMPS) and acrylamide (AMD), wherein the molar ratio of AMPS:AMD is from 30:70 to 90:10, salts thereof, or mixtures thereof.

Embodiment 16

The method of embodiment 15, wherein the molar ratio of AMPS:AMD is from 50:50 to 90:10.

Embodiment 17

The method of embodiment 12, wherein the water-soluble or water-dispersible polymer comprising pendant sulfonic acid or sulfonate salt groups comprises copolymers of 2-acrylamido-2-methylpropane sulfonic acid (AMPS) and styrene, wherein the molar ratio of AMPS is greater than 40%, salts thereof, or mixtures thereof.

Embodiment 18

The method of embodiment 17, wherein the molar ratio of AMPS is greater than 60%.

Embodiment 19

The method of embodiment 12, wherein the water-soluble or water-dispersible polymer comprising pendant sulfonic acid or sulfonate salt groups comprises copolymers of styrene-4-sulfonic acid (SS) and acrylamide (AMD), wherein the molar ratio of SS:AMD is from 30:70 to 90:10, salts thereof, or mixtures thereof.

Embodiment 20

The method of embodiment 19, wherein the molar ratio of SS:AMD is from 60:40 to 80:20.

Embodiment 21

The method of embodiment 12, wherein the water-soluble or water-dispersible polymer comprising pendant sulfonic acid or sulfonate salt groups comprises naphthalene sulfonic acid-formaldehyde condensate, salts thereof, or mixtures thereof.

Embodiment 22

The method of embodiment 12, wherein the water-soluble or water-dispersible polymer comprising pendant sulfonic acid or sulfonate salt groups comprises lignosulfonate, salts thereof, or mixtures thereof.

Embodiment 23

A hydrometallurgical solvent extraction method, the method comprising mixing an aqueous metal ion solution with an organic solution to form a mixture of metal extraction reagent capable of binding with metal ions and transferring the metal ions from the aqueous solution to the organic solution, and allowing the aqueous metal ion solution and organic solution to phase separate from the mixture; wherein prior to mixing the aqueous metal ion solution and the organic solution, a sulfonated polystyrene or salt thereof having 65 to 95 mol % sulfonation, based on the moles of styrene repeat units, a number-average molecular weight of 500 to 10,000 g/mol, and a polydispersity of 1 to 3, as measured by size exclusion chromatography against 100% sulfonated polystyrene standards, is added to the aqueous metal ion solution.

Embodiment 24

The method of any of embodiments 1 to 23, wherein the aqueous metal ion solution and organic solution are mixed in aqueous continuity.

Embodiment 25

The method of any of embodiments 1 to 23, wherein the aqueous metal ion solution and organic solution are mixed in organic continuity.

Embodiment 26

The method of any of embodiments 1 to 25, wherein the metal ion comprises copper, cadmium, chromium, cobalt, molybdenum, nickel, tin, uranium, vanadium, zinc, lithium, gold, a platinum group metal, an actinide, a rare earth element, or a combination comprising at least one of the foregoing metal ions.

Embodiment 27

The method of any of embodiments 1 to 26, wherein an amount of water-soluble or water-dispersible polymer added to the aqueous metal ion solution, the organic solution, or to both the aqueous metal ion solution and the organic solution, is 0.01 to 1,000 milligrams per liter (mg/L) of aqueous metal ion solution.

Embodiment 28

The method of any of embodiments 1 to 26, wherein an effective amount of the water-soluble or water-dispersible polymer comprising pendant sulfonic acid or sulfonate salt groups is added to the aqueous metal ion solution, the organic solution, or to both the aqueous metal ion solution and the organic solution, to reduce or prevent solid-stabilized emulsion formation compared to the same method without addition of the water-soluble or water-dispersible polymer is added.

Embodiment 29

The method of embodiment 28, wherein solid-stabilized emulsion formation is measured by the depth of the solid-stabilized emulsion layer.

Embodiment 30

The method of any of embodiments 1 to 26, wherein an effective amount of the water-soluble or water-dispersible polymer comprising pendant sulfonic acid or sulfonate salt groups is added to the aqueous metal ion solution, the organic solution, or to both the aqueous metal ion solution and the organic solution, to reduce or prevent organic solution entrainment in the aqueous metal ion solution compared to the same method without addition of the water-soluble or water-soluble polymer.

Embodiment 31

The method of any of embodiments 28 to 30, wherein the effective amount of water-soluble or water-dispersible polymer added to the aqueous metal ion solution, the organic solution, or to both the aqueous metal ion solution and the organic solution, is 0.01 to 1,000 milligrams per liter (mg/L) of aqueous metal ion solution.

WORKING EXAMPLES

Definitions of abbreviations and acronyms used herein are listed in Table 1.

TABLE 1

Abbreviations and Acronyms

| Acronym | Definition |
|---|---|
| A | Aqueous |
| AC | Aqueous Continuity |
| AMD | Acrylamide |
| AMPS | 2-Acrylamido-2-methylpropane sulfonic acid |
| BO | Barren Organic |
| E | Extract |
| Gpl | Grams per liter |
| IFT | Interfacial Tension |
| LE | Lean Electrolyte |
| LO | Loaded Organic |
| O | Organic |
| OC | Organic Continuity |
| org. | Organic |
| O/A | Organic/Aqueous |
| PDT | Phase Disengagement Time |
| PLS | Pregnant Leach Solution |
| PAM | Polyacrylamide |
| PS | Polystyrene |
| P4SSA | Poly(styrene-4-sulfonic acid) |
| SPS | Sulfonated polystyrene |
| Raff | Raffinate |
| RE | Rich Electrolyte |
| S | Strip |
| SS | Styrene-4-sulfonic acid |
| SSS | Sodium Styrene Sulfonate |
| SX | Solvent Extraction |
| TSS | Total Suspended Solids |

Materials used in the examples are described in Table 2.

TABLE 2

Materials

| Material | Chemical Name | Source |
|---|---|---|
| ORFOM ™ SX-12 | Hydrotreated petroleum distillates (CAS No. 64742-47-8) | Chevron Phillips Chemical Company |
| ACORGA ™ M5910/M5774 | 2-Hydroxy-5-nonyl benzaldehyde oxime, branched (CAS No. 174333-80-3) | Solvay |
| RHODACAL ™ N | Naphthalene sulfonic acid-formaldehyde condensate | Solvay |
| SPINOMAR ™ NaSS PS-1L | P4SSA, Mw = 3.4k | Tosoh US |
| Poly(AMPS) | Poly(2-acrylamido-2-methylpropane sulfonic acid), Mw = 800k. | Scientific Polymer Products |
| Sodium Lignosulfonate | Sulfonation on the side chains, not the aromatic rings. | Solvay |

General Preparative Procedure for Synthesis of Sulfonated Polystyrene

Sulfonated polystyrene (SPS) was prepared based on methods known in the art. Thaler (Macromolecules, 1983, 16: 623-628) describes the use of hydrocarbon-soluble acyl sulfates to carry out sulfonation of aromatic polymers, such as polystyrene, in hydrocarbon solvents. The acyl sulfate was first generated from a hydrocarbon-soluble carboxylic acid and a sulfonating agent, such as $SO_3$ or $C_1SO_3H$. Polystyrene was then reacted with the acyl sulfate to form sulfonated polystyrene and neutralized to the sodium salt using a suitable base, e.g. sodium hydroxide. The SPS of Preparative Ex. 1-5 were prepared by this procedure, and analytical characterization of the SPS' is summarized in Table 3.

Example 1. Sulfonated Polystyrene

Analytical data for the polystyrene precursor and product are provided in Table 3. Additional characterization of the product is as follows. $^1$H-NMR ($D_2O$, ppm): 7.6-6.8 (3 overlapping signals), 3.0-0.5 (broad multiplet). $^{13}$C-NMR ($D_2O$, ppm): 148.5 (singlet), 140.4 (singlet), 127.1 (doublet), 41.9 (multiplet), 22.5 (weak singlet), 19.4 (weak singlet). Raman spectroscopy (1064 nm excitation in $H_2O$, $cm^{-1}$): 1600 (strong), 1447 (weak), 1195 (medium), 1129 (strong), 1057 (medium), 1040 (medium), 1002 (medium), 982 (strong), 795 (medium); estimated sulfonation=80%. The concentration of the sulfonated polystyrene, sodium salt, was estimated by $^1$H-NMR to be 165 g/L, using 1,4-dioxane as an internal standard. Sulfonation was also estimated to be 80% by integration of the aromatic proton signals. All SPS dosages reported herein are on an active basis.

TABLE 3

Analytical Data on SPS

| SPS | Ex. 1 | Prep. Ex. 1 | Prep. Ex. 2 | Prep. Ex. 3 | Prep. Ex. 4 | Prep. Ex. 5 |
|---|---|---|---|---|---|---|
| Source | a | b | b | b | b | b |
| | | | Sulfonation | | | |
| Elemental analysis | 86%[c] | N/A | N/A | N/A | N/A | N/A |
| $^1$H-NMR | 100% | 80% | 85% | 100% | 79% | 87% |
| Raman | 94%[d] | 80% | N/A | N/A | N/A | N/A |
| | | | SEC Data | | | |
| PS precursor $M_w$ (kg/mol) | 820[c] | 1.5 | $1.5 \times 10^3$ | $1.69 \times 10^3$ | $1.4 \times 10^3$ | $1.5 \times 10^3$ |
| PS precursor $M_n$ (kg/mol) | 790[c] | 0.8 | $0.8 \times 10^3$ | $1.44 \times 10^3$ | $0.8 \times 10^3$ | $0.8 \times 10^3$ |
| PS precursor $M_w/M_n$ | 1.04[c] | 1.9 | 1.8 | 1.17 | 1.7 | 1.8 |
| SPS $M_w$[e] (kg/mol) | 1690[c] | 2.5 | $2.6 \times 10^3$ | $0.82 \times 10^3$ | $2.5 \times 10^3$ | $2.7 \times 10^3$ |
| SPS $M_n$[e] (kg/mol) | 1440[c] | 1.2 | $1.2 \times 10^3$ | $0.79 \times 10^3$ | $1.2 \times 10^3$ | $1.2 \times 10^3$ |
| SPS $M_w/M_n$[e] | 1.17[c] | 2.1 | 2.2 | 1.04 | 1.2 | 1.2 | a Scientific Polymer Products, Catalog #618.
b General Preparative Procedure herein.
[c] From Certificate of Analysis.
[d] Or 100% including 6% meta sulfonation.
[e] From SEC analysis using 100% sulfonated SPS molecular weight standards for conventional calibration (except for Ex. 1).

Example 2. Crud Reduction in Bench Scale Stir Test: General Procedure

The performance of SPS as a reagent for mitigating crud formation in solvent extraction process was measured via a bench-scale stir test. The general procedure for the test is outlined below. Those skilled in the art will appreciate that different kinds of PLS, organic solution, and solids, and different amounts of solids will result in more or less crud, and that different dosages of SPS can be used for mitigating crud formation. Synthetic PLS (A) was prepared by dissolving 1.5 mL of concentrated $H_2SO_4$, 43.9 g of $Fe_2(SO_4)_3 \cdot 5H_2O$, 432.3 g of $Al_2(SO_4)_3 \cdot 18H_2O$, 253.5 g of $MgSO_4 \cdot 7H_2O$, 39.3 g of $CuSO_4 \cdot 5H_2O$, and 15.4 g of $MnSO_4 \cdot H_2O$ in 5 L of DI water. Then the solution was titrated with 15% $H_2SO_4$ to pH 1.8. Organic solution (B) was prepared by mixing 100 mL of ACORGA™ M5910 with ca. 900 mL of ORFOM™ SX-12 with good stirring to a total volume of 1000 mL.

In a solvent extraction plant, crud formed during plant operation was processed by a three-phase centrifuge to separate the crud into aqueous phase, organic phase and solid phase. Solid phase was collected from the output of a three-phase centrifuge at a U.S.A. Cu solvent extraction plant and used in the bench-scale stir test. 100 g of solid phase was first dispersed into 800 g of the above-mentioned synthetic PLS to generate slurry (C).

In a representative test, 5 mL of slurry (C) was first dispersed into 95 mL of synthetic PLS (A) in a custom-made glass beaker with 4 molded baffles (70 mm internal diameter, baffles project out 10 mm) to prepare an aqueous solution. The SPS' were then added into the aqueous solution at various dosages. Afterwards, 100 mL of organic solution (B) was added into the glass beaker. At this point, the aqueous and organic solutions formed two separate phases, with a combined height of approximately 60 mm. An overhead stirrer with a 35 mm-diameter 6-blade pumper-mixer impeller (no spoilers) was dipped into either the organic phase in order to generate organic continuity (OC) or the aqueous phase in order to generate aqueous continuity (AC). The overhead stirrer (set at 1000 rpm) was started and the mixture was agitated for 3 minutes. Then the stirrer was stopped and a timer was started. Phase disengagement was observed for the next 5 minutes. The level of crud or emulsion layer at 5 minutes was measured by dipping a tube into the mixture in one to three distinct locations and measuring the height of the crud in the tube.

Example 2a. Evaluation of SPS with 85% Sulfonation

The performance of the SPS of Prep. Ex. 2 as a crud mitigation reagent at various dosages was evaluated according to the bench scale stir test of Ex 2. SPS dosage was calculated by the amount of polymer relative to the volume of aqueous phase. Results are summarized in Table 4. As can be seen from these data, Prep. Ex. 2 provided less crud than the controls with no additive in both organic and aqueous continuity.

TABLE 4

Depth of Crud for SPS with 85% Sulfonation

| SPS | Continuity | Dosage (ppm) | Crud/Emulsion Level (mm) | Average (mm) |
|---|---|---|---|---|
| None | Organic | 0 | 4, 6, 5 | 5 |
| | | 0 | 6, 4, 5 | 5.0 |
| | | 0 | 4, 5, 5 | 4.7 |
| Prep. Ex. 2 | Organic | 5 | 2, 4, 3 | 3 |
| | | 5 | 3, 4, 3 | 3.3 |
| | | 20 | 1, 2, 2 | 1.7 |
| | | 20 | 1, 2, 1 | 1.3 |
| | | 50 | 1, 1, 1 | 1 |
| | | 50 | 1, 1, 1 | 1 |
| | | 150 | 0, 0, 0 | 0 |
| | | 150 | 0, 0, 0 | 0 |

TABLE 4-continued

Depth of Crud for SPS with 85% Sulfonation

| SPS | Continuity | Dosage (ppm) | Crud/Emulsion Level (mm) | Average (mm) |
|---|---|---|---|---|
| None | Aqueous | 0 | 37 | 37 |
| Prep. Ex. 2 | Aqueous | 5 | 37 | 37 |
|  |  | 20 | 23, 24 | 23.5 |
|  |  | 50 | 13, 11 | 12 |
|  |  | 150 | 1, 1 | 1 |

Example 2b. Evaluation of SPS with 100% Sulfonation

The performance of the SPS of Prep. Ex. 3 as a crud mitigation reagent at various dosages was evaluated according to the bench scale stir test of Ex 2. SPS dosage was calculated by the amount of polymer relative to the volume of aqueous phase. The results are summarized in Table 5. As can be seen from these data, Prep. Ex. 3 provided less crud than the controls with no additive in both organic and aqueous continuity.

TABLE 5

Depth of Crud for SPS at 100% Sulfonation

| SPS | Continuity | Dosage (ppm) | Crud/Emulsion Level (mm) | Average (mm) |
|---|---|---|---|---|
| None | Organic continuity | 0 | 4, 5, 5 | 4.7 |
| Prep. Ex. 3 | Organic continuity | 5 | 4, 5, 4 | 4.3 |
|  |  | 20 | 4, 5, 4 | 4.3 |
|  |  | 50 | 2, 2, 2 | 2 |
|  |  | 150 | 1, 2, 2 | 1.7 |
|  |  | 150 | 1, 1, 2 | 1.3 |
| None | Aqueous continuity | 0 | 37 | 37 |
| Prep. Ex. 3 | Aqueous continuity | 150 | 25 | 25 |

Example 2c. Evaluation of SPS with 65 to 96% Sulfonation

The effect of percent sulfonation of SPS on crud mitigation was evaluated according to the bench scale stir test of Ex 2. SPS dosage was calculated by the amount of polymer relative to the volume of aqueous phase. The results are summarized in Table 6. As can be seen from these data, the amount of crud is minimized at 65 to 85% sulfonation, and in particular, at 70 to 80% sulfonation.

TABLE 6

Depth of Crud as Function of Percent Sulfonation and Dosage

| | Dosage (ppm) | | | | | |
|---|---|---|---|---|---|---|
| | Crud level (mm) 20 | | Crud level (mm) 75 | | Crud level (mm) 275 | |
| % Sulfonation | OC | AC | OC | AC | OC | AC |
| Blank | 8.0 | 36 | 8.0 | 36 | 8.0 | 36 |
| 65% | 4 | 25.3 | 2 | 2.3 | 1 | 1 |
| 70% | 4 | 20.7 | 1.7 | 2.7 | 1 | 1 |
| 76% | 5 | 15.3 | 1.7 | 2.3 | 1 | 1 |
| 80% | 5 | 16.3 | 2 | 2 | 1 | 1 |
| 85% | 6 | 18.7 | 2 | 3.7 | 1 | 1 |
| 91% | 7.3 | 25.7 | 4 | 7.7 | 2.3 | 2.7 |
| 96% | 7.7 | 26.7 | 4.7 | 5 | 2.7 | 3 |

Example 3. Evaluation of Sodium Styrene Sulfonate Monomer (SSS)

The effect of using a monomeric sulfonate (SSS) on crud mitigation was evaluated in the bench scale stir test of Ex. 2. The results are summarized in Tables 7 (organic continuity) and 8 (aqueous continuity). As can be seen from these data, SSS was not effective in reducing crud formation relative to the blank in either organic or aqueous continuity.

TABLE 7

Depth of Crud with SSS, Organic Continuity

| Test | 1 | 2 | 3 | 4 | 5 |
|---|---|---|---|---|---|
| Solids Level (ppm) | 3600 | | | | |
| Continuity | OC | OC | OC | OC | OC |
| 0.1% SSS Amount (µL) | 0 | 50 | 150 | 300 | 1000 |
| Total SSS Dosage (ppm) | 0 | 5 | 20 | 50 | 150 |
| Time (s) | Dispersion/crud/emulsion Layer (mm) | | | | |
| 0 | 65 | 65 | 65 | 65 | 65 |
| 15 | 21 | 20 | 21 | 21 | 26 |
| 30 | 14 | 14 | 16 | 16 | 20 |
| 45 | 12 | 11 | 12 | 12 | 14 |
| 60 | 11 | 10 | 11 | 10 | — |
| 75 | 10 | — | — | — | 10 |

TABLE 8

Depth of Crud with SSS, Aqueous Continuity

| Test | 1 | 2 | 3 | 4 |
|---|---|---|---|---|
| Solid Level (ppm) | 3600 | | | |
| Continuity | AC | AC | AC | AC |
| 0.1% SSS Amount (µL) | 0 | 200 | 300 | 1000 |
| Total SSS Dosage (ppm) | 0 | 20 | 50 | 150 |
| Time (s) | Dispersion/crud/emulsion band (mm) | | | |
| 0 | 65 | 65 | 65 | 65 |
| 15 | 50 | 56 | — | — |
| 30 | 43 | 49 | — | — |
| 60 | — | — | 44 | — |
| 120 | 40 | 41 | — | — |
| 180 | 40 | 40 | 41 | 41 |

Example 4. Crud Reduction in Lab-scale Continuous Test

Two equivalent lab-scale solvent extraction circuits were set up, each with one extract stage and one strip stage. All stages were operated with organic continuous mixing. The PLS, organic (ACORGA™ M5910, 25.1 vol %) and electrolyte were obtained from a North American copper SX operation. The PLS and organic flow rates were 125 mL/min whereas the electrolyte flow rate was 62.5 mL/min, to maintain 1:1 O:A in the extract stage and 2:1 O:A in the strip stage. The SPS of Prep. Ex. 1 was diluted to 5 g/L and mixed in-line with the PLS in the test circuit (at 2.5 mL/min) before it reached the mixer, such that the concentration in the PLS would be 10 mg/L. There was no additive in the control circuit. The circuits were operated at ambient temperature (approx. 21° C.) and were run for a total of 40.5 h over 5 days. Each stage consisted of a mixer (8.5 cm long×8.4 cm wide×8 cm deep) and a settler (12 cm long×5.9 cm wide×35 cm deep). Each circuit included a loaded organic tank (2 L). The crud height at the weir was measured approximately every 2 h. The results are summarized in Table 9. As can be seen from the data, the test circuit had less crud than the control circuit.

TABLE 9

Depth of Crud at Weir in Extract Settler[a]

| Day | Run Time (h) | Crud (cm) in Control Circuit | Crud (cm) in Test Circuit |
|---|---|---|---|
| Day 1 | 0 | — | — |
|  | 2 | 0.6 | 0.5 |
|  | 4 | 1.1 | 0.7 |
|  | 5.5 | 1.2 | 0.7 |
|  | 8 | 2.0 | 1.0 |
|  | 10 | 2.0 | 1.2 |
|  | 10.5 | — | — |
| Day 2 | 10.5 | — | — |
|  | 12 | 2.0 | 0.6 |
|  | 13.5 | — | — |
| Day 3 | 13.5 | — | — |
|  | 15 | 2.5 | 1.0 |
|  | 17 | 2.0 | 1.0 |
|  | 19.5 | 2.5 | 1.0 |
|  | 21 | 2.5 | 1.0 |
|  | 23.5 | — | — |
| Day 4 | 23.5 | — | — |
|  | 25.5 | 2.5 | 1.0 |
|  | 28.5 | 2.0 | 0.6 |
|  | 31.5 | 2.0 | 0.4 |
|  | 32.5 | — | — |
| Day 5 | 32.5 | — | — |
|  | 34.5 | 1.5 | 0.0 |
|  | 37.5 | 2.0 | 0.0 |
|  | 40 | 2.0 | 0.0 |
|  | 40.5 | — | — |

[a]Crud measurements not taken immediately after the daily start up.

At the end of the test, the organic solution from each extract stage was filtered through 1-μm fiberglass filter paper and the solids were dried and measured. The control plant had 4258 ppm solids whereas the test plant had 914 ppm. The higher concentration of suspended solids recovered from the organic phase from the control plant shows that there was more crud in the control plant.

During Day 4, the total suspended solids (TSS) in the raffinate of test and control circuits, and in the PLS, were analyzed. The results are summarized in Table 10. Both the test and control raffinates had lower TSS than the PLS, indicating some retention of solids in the circuits. The test raffinate, however, had higher TSS than the control raffinate, showing that the amount of solids trapped in the test circuit (i.e. crud) was lower than in the control circuit.

TABLE 10

Total Suspended Solids (ppm) in Aqueous Phases

| Run time (h) | PLS | Test Raffinate | Control Raffinate |
|---|---|---|---|
| 26 | — | 519 | 505 |
| 27 | — | 784 | 696 |
| 28 | 902 | 786 | 734 |
| 29 | 904 | 799 | 737 |

Example 5. Crud Reduction in Lab-Scale Continuous Test

Two equivalent lab-scale solvent extraction circuits were set up, each with one extract stage and one strip stage (all stages were operated with organic continuous mixing). The PLS, organic (ACORGA™ M5910, 25.1 vol. %), and electrolyte were obtained from a North American copper SX operation. The PLS and organic flow rates were 125 mL/min whereas the electrolyte flow rate was 62.5 mL/min, to maintain 1:1 O:A in the extract stage and 2:1 O:A in the strip stage. The SPS of Ex. 1 was diluted to 5 g/L and mixed in-line with the PLS in the "test" circuit (at 2.5 mL/min) before it reached the mixer, such that the concentration in the PLS would be 10 mg/L. The circuits were operated at ambient temperature (approx. 21° C.) and were run for a total of 17.5 h over 3 days. During the first 6 h, the test circuit was treated with the SPS of Ex. 1. After this period, the extraction stages of both the test and control circuits were cleaned out and the test was started up again using the SPS of Prep. Ex. 1. Each stage consisted of a mixer (8.5 cm long×8.4 cm wide×8 cm deep) and a settler (12 cm long×5.9 cm wide×35 cm deep). Each circuit included a loaded organic tank (2 L). The crud height at the weir was measured approximately every 2 h, and the results are summarized in Table 11. The test circuit had less crud than the control circuit on Days 2 and 3.

TABLE 11

Depth of Crud (cm) in Middle of Extraction Settler[a]

| Day | Run Time (h) | Additive | Test | Control[b] |
|---|---|---|---|---|
| Day 1 | 0 | Ex. 1 | — | — |
|  | 1.5 |  | 1.0 | 1.0 |
|  | 3.5 |  | 1.0 | 1.5 |
|  | 5.5 |  | 1.0 | 1.5 |
|  | 6.5 |  | — | — |
| Day 2 | 8.25 | Prep. Ex. 1 | 0.0 | 0.0 (0.8) |
|  | 10.25 |  | 0.0 | 0.0 (1.1) |
|  | 11.5 |  | — | — |
| Day 3 | 12.5 |  | 0.0 | 0.0 (1.5) |
|  | 14.5 |  | 0.0 | 0.0 (1.0) |
|  | 16.5 |  | 0.0 | 1.1 |
|  | 17.5 |  | — | — |

[a]Crud measurements not taken immediately after the daily start up.
[b]Numbers in parentheses refer to depth of crud in settler immediately after mixer.

Example 6. Crud Reduction in On-Site Continuous Pilot-Scale Test

Two equivalent pilot-scale solvent extraction circuits were set up on-site at a North American copper SX operation, each with two extract stages in parallel and one strip stage. The first extract stage was operated in aqueous continuity, whereas the strip stage and the second extract stage were both operated in organic continuity. The organic solution (ACORGA™ M5910, 4.5 vol. %) was obtained from the site and the PLS and electrolyte were continuously piped in from the site. The PLS and organic solution flow rates were 4 L/min whereas the electrolyte flow rate was 1 L/min to maintain 1:1 O:A in the extract stage and 4:1 O:A in the strip stage. The SPS of Prep. Ex. 1 was diluted to 5 g/L and mixed in-line with the PLS in the test circuit (at 8 mL/min) before it reached the mixer, such that the concentration in the PLS would be 10 mg/L. The circuits were operated outdoors at ambient temperature, approximately 25 to 43° C., and were continuously operated for a total of 200 h. For the first 18 h, no SPS was added. From 18 to 44 h, the dose of SPS was 2 ppm in the test circuit and from 44 to 114 h, the dose of SPS in the test circuit was 10 ppm. From 114 to 144 h, no SPS was added. Each stage consisted of a mixer (33 cm long×33 cm wide×27 cm deep) and a settler (74 cm long×33 cm wide×28 cm deep). Each circuit included a loaded organic tank (106 L). Table 12 shows the depth of the crud that formed in the middle of the extract settler in the stage that was operated in organic continuity. As can be seen from these data, the depth of crud was consistently larger in the control circuit.

TABLE 12

Depth of Crud (cm) at Middle of Extract Settler (Organic Continuity)

| Run time (h) | Test | Control |
|---|---|---|
| 0 | 0.0 | 0.0 |
| 2 | 0.0 | — |
| 6 | 0.0 | 0.0 |
| 8 | 0.0 | 0.0 |
| 10 | 0.0 | 0.0 |
| 13 | 0.0 | 0.0 |
| 15 | 0.0 | 0.0 |
| 18 | 0.1 | — |
| 22 | 0.1 | — |
| 24 | 0.1 | — |
| 26 | 0.1 | — |
| 32 | 0.1 | 0.2 |
| 33 | 0.1 | 0.3 |
| 35 | 0.1 | 0.3 |
| 37 | 0.1 | 0.3 |
| 39 | 0.1 | 0.3 |
| 42 | 0.2 | 0.3 |
| 44 | 0.1 | 0.5 |
| 46 | 0.3 | 0.5 |
| 48 | 0.2 | 0.3 |
| 50 | 0.2 | 0.4 |
| 54 | 0.2 | 0.5 |
| 56 | 0.2 | 0.3 |
| 58 | 0.2 | 0.3 |
| 60 | 0.2 | 0.3 |
| 62 | 0.2 | 0.3 |
| 66 | 0.2 | 0.5 |
| 68 | 0.2 | 0.4 |
| 70 | 0.2 | 0.4 |
| 72 | 0.2 | 0.5 |
| 74 | 0.2 | 0.9 |
| 78 | 0.2 | 0.7 |
| 80 | 0.2 | 0.7 |
| 82 | 0.2 | 0.7 |
| 84 | 0.1 | 0.7 |
| 86 | 0.1 | 0.7 |
| 90 | 0.1 | 0.5 |
| 92 | 0.1 | 0.6 |
| 98 | 0.1 | 0.7 |
| 102 | 0.0 | 0.9 |
| 104 | 0.0 | 0.9 |
| 106 | 0.0 | 1.0 |
| 108 | 0.1 | 1.0 |
| 110 | 0.1 | 1.0 |
| 114 | 0.0 | 0.5 |
| 116 | 0.0 | 0.5 |
| 118 | 0.0 | 0.5 |
| 120 | 0.0 | 0.5 |
| 126 | 0.1 | 0.8 |
| 128 | 0.1 | 0.8 |
| 130 | 0.1 | 0.7 |
| 132 | 0.0 | 0.7 |
| 134 | 0.1 | 1.0 |
| 138 | 0.1 | 1.0 |
| 140 | 0.0 | 0.75 |
| 142 | 0.0 | 0.75 |
| 144 | 0.0 | 0.75 |

Example 7. Crud Reduction in On-Site Continuous Pilot-Scale Tests

Two equivalent pilot-scale solvent extraction circuits were set up on-site at a North American copper SX operation, each with two extract stages in parallel and one strip stage. The organic (ACORGA™ M5774, 12.8 vol. %) was obtained from the site and the PLS and electrolyte were continuously piped in from the site. A schematic of the solvent extraction circuits are provide in FIG. 1, and the test conditions (Condition 1) are summarized in Table 13. With reference to FIG. 1, E, S, BO, LO, LE, RE, PLS, and Raff, are defined in Table 1. E1 and E2 represent two solvent extraction stages running in parallel, and S1 represents a strip stage running in parallel with E1 and E2. The PLS and organic flow rates were 4 L/min whereas the electrolyte flow rate was 2 L/min to maintain 1:1 O:A in the extract stage and 2:1 O:A in the strip stage. Each stage consisted of a mixer (33 cm long×33 cm wide×27 cm deep) and a settler (74 cm long×33 cm wide×28 cm deep). Each circuit included a loaded organic tank (106 L). In the test circuit, the SPS of Prep. Ex. 4 and 5 were diluted to 5 g/L or 1 g/L and mixed in-line with the PLS in the test circuit before it reached the mixer, such that the concentration in the PLS would be 10 mg/L or 2 mg/L. There was no additive in the control circuit. The circuits were operated semi-continuously (12 h operation each day) in a covered outdoor area for a total of 108 h.

The circuits were operated according to the parameters in Table 13, with the exception that no SPS was added initially to obtain baseline conditions and ensure that the circuits were operating equivalently. However, it was not possible to operate E1 of either circuit in aqueous continuity for longer than 10 min, due to extreme emulsification resulting in excessive flooding and very high organic and aqueous entrainment. Therefore, the control circuit was changed to run both extract stages in organic continuity, and the SPS of Prep. Ex. 4 was dosed into the E1 (in aqueous continuity) and E2 (in organic continuity) stages of the test circuit at 10 mg/L. The test circuits operated successfully for 6 h with E1 in aqueous continuity. The dispersion band fully coalesced before reaching the weir and the average PDT was 272 s. The addition of the SPS enabled the circuit to run in aqueous continuity.

TABLE 13

Test Parameters for Condition 1

| Parameter (units) | Test | Control |
|---|---|---|
| E1 PLS flow rate (L/min) | 4 | 4 |
| E2 PLS flow rate (L/min) | 4 | 4 |
| O Flow rate (L/min) | 4 | 4 |
| LE Flow rate (L/min) | 2 | 2 |
| E1 & E2 O/A | 1 | 1 |
| S1 O/A | 2 | 2 |
| E1 Continuity | Aqueous | Aqueous, Then Organic |
| E1 Dosage (mg/L) | 10 | — |
| E2 Continuity | Organic | Organic |
| E2 Dosage (mg/L) | 10 | — |
| S1 Continuity | Organic | Organic |
| Mixer speed (rpm) | 340 | 340 |

The effect of SPS dosage in organic continuity was then tested by operating the plants according to the parameters in Table 14 (Condition 2), with the exception of the initial baseline period in which both circuits were operated without adding any SPS (6-18 h). Following that, the test circuit was dosed with the SPS of Prep. Ex. 4 (2 and 10 mg/L as described above) from 18 to 46 h. During this period, an insufficient amount of crud formed in either circuit to enable a comparison. Consequently, solids were obtained from the PLS clarification circuit of the plant and added to the PLS feeding both the test and control circuits (46-84 h, except during the period 65-71 h when the PLS feed from the plant contained a sufficient solids content). For the period 84 to 110 h, the SPS of Prep. Ex. 4 was replaced with the SPS of Prep. Ex. 5, with addition of solids.

TABLE 14

Test Parameters for Condition 2

| Parameter (units) | Test | Control |
|---|---|---|
| E1 PLS flow rate (L/min) | 4 | 4 |
| E2 PLS flow rate (L/min) | 4 | 4 |
| Organic flow rate (L/min) | 4 | 4 |
| LE Flow rate (L/min) | 2 | 2 |
| E1 & E2 O/A | 1 | 1 |
| S1 O/A | 2 | 2 |
| E1 Continuity | Organic | Organic |
| E1 Dosage (mg/L) | 2 | — |
| E2 Continuity | Organic | Organic |
| E2 Dosage (mg/L) | 10 | — |
| S1 Continuity | Organic | Organic |
| Mixer speed (rpm) | 340 | 340 |

Figure 2A:
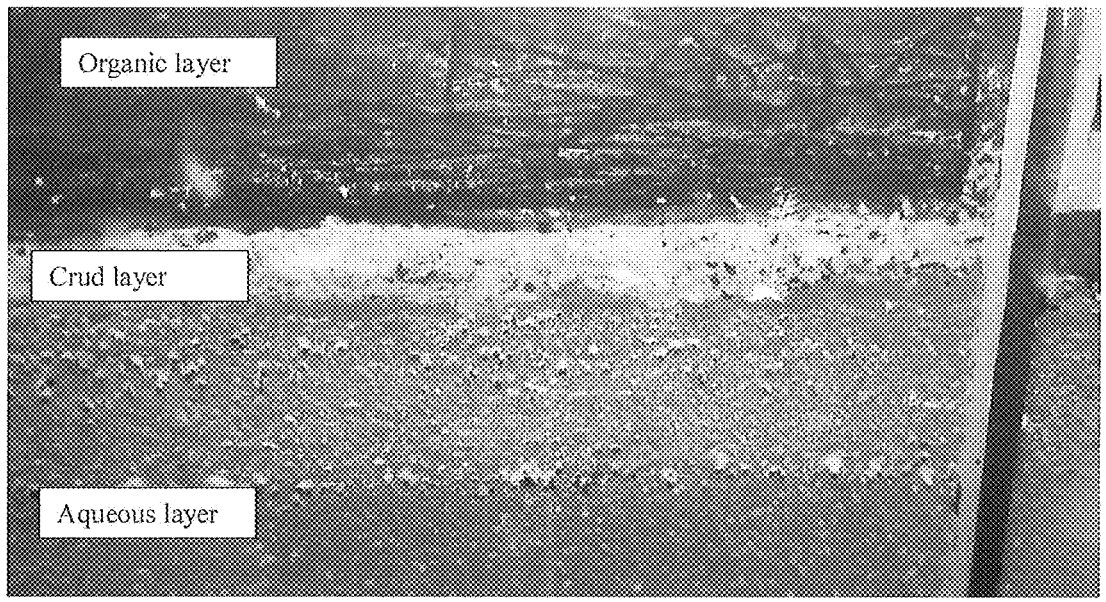
FIG. 2a is a photo of organic, solid-stabilized emulsion and aqueous phase layers in a solvent extraction circuit in which no water-soluble or water-dispersible polymer having pendant sulfonic acid or sulfonate salt groups is used.
Figure 2B:
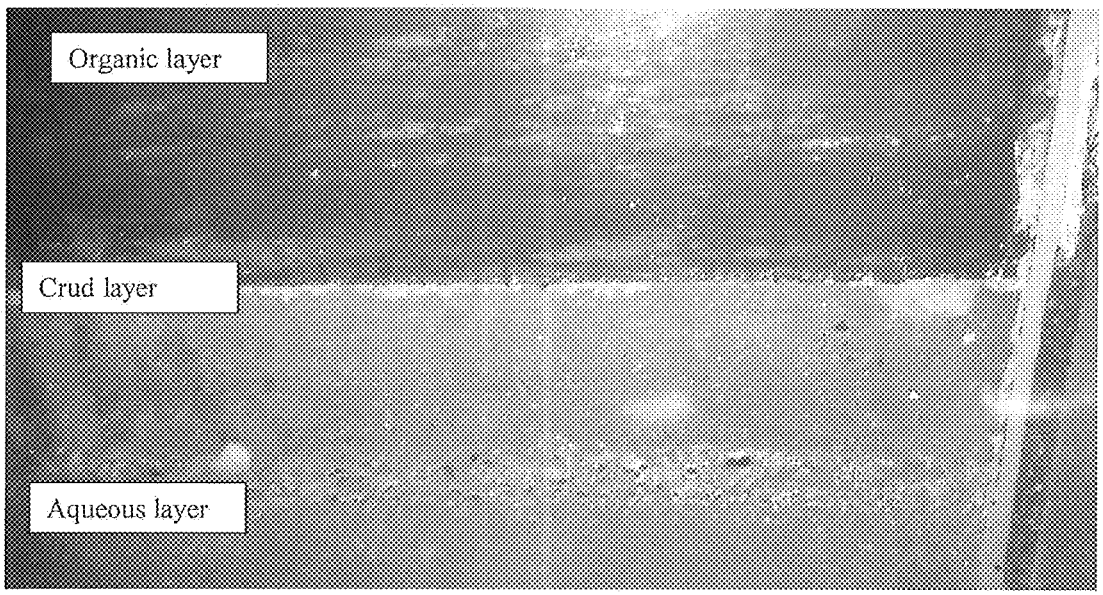
FIG. 2b is a photo of organic, solvent-stabilized emulsion, and aqueous layers in a solvent extraction circuit in which the aqueous layer was dosed with 10 ppm of sulfonated polystyrene (SPS).

Depth of crud at weir and organic/aqueous entrainment data from the on-site continuous tests in organic continuity (Condition 2 as described in Table 14) are summarized in Tables 15 and 16, respectively. As can be seen in Table 15, reductions in crud formation were observed at both 2 and 10 mg/L, and the SPS of Prep. Ex. 4 and Prep. Ex. 5 were both effective at reducing crud formation. As can be seen from Table 16, there was also a reduction in organic in aqueous entrainment at both 2 and 10 mg/L of SPS. For illustrative purposes, FIG. 2a is a photo of organic, solid-stabilized emulsion, and aqueous phase layers in a solvent extraction circuit in which no additive is used; and FIG. 2b is a photo of organic, solvent-stabilized emulsion, and aqueous layers in a solvent extraction circuit in which the aqueous layer was dosed with 10 ppm SPS.

TABLE 15

Depth of Crud at Weir

| | | | Crud level (cm) (dip tube at weir) | | | |
|---|---|---|---|---|---|---|
| | | Run | E1 | | E2 | |
| Day | Condition | Time (h) | 2 ppm | Control | 10 ppm | Control |
| 2 | Dosing Prep. Ex. 4 | 20.0 | 0.7 | — | 0.0 | — |
| | No solids added | 22.0 | 0.0 | — | 0.0 | — |
| | | 24.0 | 0.0 | — | 0.0 | — |
| 3 | Dosing Prep. Ex. 4 | 29.0 | — | 0.5 | — | 0.0 |
| | No solids added | 31.0 | — | 0.6 | — | 0.0 |
| | | 33.0 | — | 0.0 | — | 0.0 |
| 4 | Dosing Prep. Ex. 4 | 42.0 | 0.5 | — | 0.0 | — |
| | No solids added | | | | | |
| 4 | Dosing Prep. Ex. 4 | 46.3 | 0.9 | — | 0.0 | — |
| | Solids added | 47.0 | 0.0 | — | 0.0 | — |
| | | 49.5 | 0.2 | 0.8 | 0.0 | 0.0 |
| 5 | Dosing Prep. Ex. 4 | 51.0 | — | 1.3 | — | 0.4 |
| | Solids added | 53.0 | 0.3 | 1.2 | 0.0 | 0.5 |
| | | 55.0 | 0.0 | 1.0 | 0.0 | 0.7 |
| | | 58.0 | 0.0 | — | 0.0 | — |
| | | 60.0 | 0.0 | 1.5 | 0.0 | 0.6 |
| 6 | Dosing Prep. Ex. 4 | 65.5 | 0.0 | 1.5 | 0.0 | 1.2 |
| | No solids added | 68.5 | 0.0 | 2.2 | 0.0 | 2.5 |
| | | 71.5 | 0.0 | 2.0 | 0.0 | 1.3 |
| 7 | Dosing Prep. Ex. 4 | 74.2 | 0.0 | 3.0 | 0.0 | 2.5 |
| | Solids added | 76.2 | 0.0 | 3.0 | 0.0 | 2.5 |
| | | 79.2 | 0.0 | 6.0 | 0.0 | 2.0 |
| | | 82.2 | 0.0 | 6.0 | 0.0 | 2.5 |
| 8 | Dosing Prep. Ex. 5 | 86.0 | 0.0 | 2.0 | 0.0 | 2.0 |
| | Solids added | 88.5 | 0.0 | 2.0 | 0.0 | 2.0 |
| | | 91.5 | 0.0 | 3.0 | 0.0 | 3.5 |
| | | 94.5 | 0.0 | 3.0 | 0.0 | 2.5 |
| 9 | Dosing Prep. Ex. 5 | 97.7 | 0.0 | 3.5 | 0.0 | — |
| | Solids added | 100.0 | 0.0 | 5.0 | 0.0 | 0.0 |
| | | 103.0 | 0.0 | 5.0 | 0.0 | 2.0 |
| | | 105.5 | 0.0 | 6.0 | 0.0 | 0.0 |
| 10 | Dosing Prep. Ex. 5 | 107.7 | 0.0 | 2.0 | 0.0 | 0.0 |
| | Solids added | | | | | |

TABLE 16

Organic in Aqueous Entrainment

| | | | O/A Entrainment (ppm) | | | |
|---|---|---|---|---|---|---|
| | | Run | E1 | | E2 | |
| Day | Condition | Time (h) | 2 ppm | Control | 10 ppm | Control |
| 1 | Baseline | 8.0 | 400 | 380 | 200 | 180 |
| | | 10.0 | — | 500 | — | 160 |
| | | 14.0 | — | 380 | — | 150 |
| | | 17.0 | 500 | 500 | 250 | 150 |
| 2 | Dosing Prep. Ex. 4 | 20.0 | 90 | 330 | 40 | 180 |
| | No solids added | 22.0 | 80 | 340 | 30 | 140 |
| | | 24.0 | 70 | 370 | 20 | 150 |
| | | 27.0 | 50 | 460 | 30 | 150 |
| 3 | Dosing Prep. Ex. 4 | 31.0 | 60 | 470 | 30 | 170 |
| | No solids added | 33.0 | 50 | 480 | 20 | 140 |
| | | 35.0 | 60 | 450 | 30 | 150 |
| | | 38.0 | 70 | 480 | 40 | 170 |
| 4 | Dosing Prep. Ex. 4 | 42.0 | 60 | 460 | 20 | 220 |
| | No solids added | | | | | |
| 5 | Dosing Prep. Ex. 4 | 47.0 | 80 | 360 | 50 | 310 |
| | Solids added | 49.5 | 80 | 220 | 50 | 410 |
| 5 | Dosing Prep. Ex. 4 | 53.0 | 60 | 260 | 40 | 300 |
| | Solids added | 55.0 | 60 | 250 | 70 | 260 |
| | | 58.0 | 50 | 240 | 30 | 140 |
| | | 60.0 | 40 | 220 | 20 | 250 |
| 6 | Dosing Prep. Ex. 4 | 65.5 | 30 | 280 | 40 | 140 |
| | No solids added | 68.5 | 20 | 240 | 20 | 60 |

TABLE 16-continued

Organic in Aqueous Entrainment

| Day | Condition | Run Time (h) | O/A Entrainment (ppm) | | | |
|---|---|---|---|---|---|---|
| | | | 2 ppm | E1 Control | 10 ppm | E2 Control |
| 7 | Dosing Prep. Ex. 4 | 74.2 | 30 | 200 | 20 | 70 |
| | Solids added | 76.2 | 30 | 180 | 20 | 40 |
| | | 79.2 | 30 | 220 | 40 | 70 |
| | | 82.2 | 20 | 180 | 40 | 80 |
| 8 | Dosing Prep. Ex. 5 | 86.0 | 40 | 380 | 20 | 300 |
| | Solids added | 88.5 | 40 | 430 | 30 | 210 |
| | | 91.5 | 40 | 480 | 40 | 265 |
| | | 94.5 | 40 | 445 | 30 | 245 |
| 9 | Dosing Prep. Ex. 5 | 97.7 | 365 | — | 85 | — |
| | Solids added | 100.0 | 80 | 425 | 20 | 340 |
| | | 103.0 | 60 | 540 | 20 | 350 |
| | | 105.5 | 80 | 500 | 40 | 360 |
| 10 | Dosing Prep. Ex. 5 | 107.7 | 120 | 600 | 40 | 390 |
| | Solids added | | | | | |

Example 8. Preparative Procedure for AMPS-AMD and SS-AMD Copolymers

Water, sulfonated monomer solution and acrylamide solution (0.25 mM total monomer) were added into glass vials under a stream of $N_2$. Ammonium persulfate solution (11.4 mol %) was then added to each vial and finally sodium metabisulfite (14.9 mol %) was added to each vial. The vials were then placed in the heating block, stirred magnetically and heated to 55° C. (20 min). The reaction was continued at 55° C. for 24 h, at which point the vials were removed from the heating block and samples were analyzed by $^{13}$C-NMR and SEC. Analytical data is provided in Tables 17 and 18, respectively.

TABLE 17

Analytical Data for AMPS:AMD Copolymers

| Example | | 8a | 8b | 8c | 8d |
|---|---|---|---|---|---|
| AMPS:AMD | | 90:10 | 80:20 | 70:30 | 60:40 |
| AMPS (mmol) | | 2.25 | 2.00 | 1.75 | 1.50 |
| AMD (mmol) | | 0.25 | 0.50 | 0.75 | 1.00 |
| Mw (kg/mol) | | 24.8 | 22.2 | 19.8 | 17.0 |
| Mn (kg/mol) | | 9.8 | 6.3 | 5.7 | 5.5 |
| $^{13}$C-NMR | 179 ppm[a] | 12.5 | 22.95 | 32.33 | 40.42 |
| Integration | 175 ppm[b] | 87.5 | 77.05 | 67.67 | 59.58 |
| | 57 ppm | 85.82 | 81.06 | 75.34 | 67.79 |
| | 52 ppm | 89.33 | 89.2 | 82.39 | 76.69 |
| | 45-31 ppm | 191.68 | 206.7 | 210.99 | 214.11 |
| | 26 ppm | 178.31 | 166.61 | 146.88 | 153.54 |
| AMPS %[c] | | 88% | 77% | 68% | 60% |

[a]AMD C=O.
[b]AMPS C=O.
[c]AMPS/(AMPS + AMD), from integration of carbonyl carbons.

TABLE 18

Analytical Data on SS:AMD Copolymers

| Example | 8e | 8f | 8g |
|---|---|---|---|
| SS:AMD | 80:20 | 70:30 | 60:40 |
| SS (mmol) | 2.00 | 1.75 | 1.50 |
| AMD (mmol) | 0.50 | 0.75 | 1.00 |

TABLE 18-continued

Analytical Data on SS:AMD Copolymers

| Example | | 8e | 8f | 8g |
|---|---|---|---|---|
| Mw (kg/mol) | | 5.7 | 4.7 | 2.2 |
| Mn (kg/mol) | | 4.7 | 1.9 | 1.9 |
| $^{13}$C-NMR | 181 ppm | 10.93 | 19.83 | 33.38 |
| Integration | 149 ppm[a] | 33.58 | 64.29 | 27.7 |
| | 140 ppm[a] | 39.71 | 40.81 | 32.29 |
| | 129 ppm[a] | 71.43 | 83.71 | 58.33 |
| | 125 ppm[a] | 85.36 | 94.04 | 70.88 |
| | 50-23 ppm[b] | 100 | 100 | 100 |
| SS %[c] | | 77% | 94% | 63% |

[a]Aromatic peaks
[b]Backbone peaks
[c]From integration ratio: (total aromatic peaks/6)/(backbone peaks/2)

Example 9. Preparative Procedure for P4SSA

Sodium styrene-4-sulfonate (7.2 g) was dissolved in water (63 mL) and then ammonium persulfate (1.3 g) and sodium metabisulfite (1.4 g) were added. The mixture was heated at 60° C. for 24 h. The solution was analyzed by SEC and $^1$H-NMR and characterization data is reported as follows: Mw=8.8 kg/mol, Mn=4.7 kg/mol. $^1$H-NMR ($D_2O$) (chemical shift, number of protons, integration): 8.2-6.0 (broad multiplet, 5H, 190); 2.5-0.8 (broad multiplet, 3H, 116).

Example 10. Preparative Procedure for Styrene-AMPS Copolymers

Styrene-AMPS co-polymers were prepared by MADIX controlled polymerization, based on a method known in the art (*Polymer Chemistry*, 2014, 5: 2202-2207), using PAM7-XA1 and V50 as the initiator, in water using the following monomer ratios:

a) AMPS:styrene=95:5. Mw=9.0 kg/mol, Mn=5.1 kg/mol. $^1$H-NMR ($D_2O$) (chemical shift, number of protons, integration): 7.8-6.8 (multiplet, 5H, 2.1); 3.9-3.0 (broad singlet, 2H, 19.2)=96% AMPS incorporation.
b) AMPS:styrene=50:50. Mw=26 kg/mol*, 14 kg/mol*. $^1$H-NMR ($D_2O$) (chemical shift, number of protons, integration): 7.5-6.2 (broad multiplet, 5H, 10.1); 3.7-3.0 (broad singlet, 2H, 19.5)=83% AMPS incorporation.
c) AMPS:styrene=25:75. Mw=21 kg/mol*, Mn 5.9 kg/mol*. $^1$H-NMR (DMF) (chemical shift, number of protons, integration): 8.0-6.0 (broad multiplet, 5H, 10.9); 3.5-2.9 (broad singlet, 2H, 1.52)=16% AMPS incorporation.

*Mw exceeds exclusion limit of column and is therefore an underestimate.

Example 11: Crud Reduction in Bench Scale Stir Test

The performance of the various sulfonated polymers of Example 8 for mitigating crud formation in solvent extraction processes was measured via the bench-scale stir test as outlined generally in Example 2, supra. Pulverized muscovite (0.1 g) was added to 20 mL of 1% vol. ACORGA™ M5910 in ORFOM™ SX-12, in a 50-mL centrifuge tube. The tip of the homogenizer was positioned just below the 10-mL gradation on the centrifuge tube. The organic/muscovite was mixed at 18 k rpm until opaque, then 10 mL of R3 PLS (containing 6.0 g/L $Cu^{2+}$ and 3.0 g/L $Fe^{3+}$, as sulfate salts, at pH 2, and the desired dose sulfonated polymer) was added with the homogenizer operating. Mixing was continued for 60 s, then stopped, leaving the homogenizer in place. After 3 min. of settling time, the height of the dispersion was measured. As can be seen from the data, the control test (no crud mitigation reagent) had a dispersion layer width of 45 mm in the centrifuge tube. Therefore, a dispersion measurement of <45 mm indicated efficacy of the sulfonated polymers for mitigating crud formation in a solvent extraction process. In a modification of this test, 10 mL of R3 PLS without any sulfonated polymer was added with the homogenizer operating. Then, while continuing mixing, the desired dose of sulfonated polymer was added to the mixed phases via micropipet. The results are summarized in Tables 19a and 19b.

TABLE 19a

Evaluation of Sulfonated Polymers as Crud Mitigation Reagents Using Bench-Scale Stir Test[a]

| Source | Description | Active (mg/L) | Result[b] | Dispersion Band Width (mm) | Comment |
|---|---|---|---|---|---|
| | No crud mitigation reagent (Control) | 0 | – | 45 | Organic phase emulsified, clear aq phase |
| General Preparative Procedure for SPS | Sulfonated polystyrene (SPS), 88% sulfonation | 50 | + | 0 | Clear phases, clean interface |
| General Preparative Procedure for SPS | Sulfonated polystyrene (SPS), 86% sulfonation | 50[c] | + | 0 | — |
| Ex. 8a | AMPS:AMD (88% AMPS) | 50 | + | 0 | Scattered droplets at interface |
| Ex. 8b | AMPS:AMD (77% AMPS) | 50 | + | 0 | Clean interface |
| Ex. 8c | AMPS:AMD (68% AMPS) | 50 | + | 0 | Clean interface |
| Ex. 8c | AMPS:AMD (68% AMPS) | 50[c] | + | 0 | — |
| Ex. 8d | AMPS:AMD (60% AMPS) | 50 | + | 0 | Scattered droplets at interface |
| Solvay (RHODACAL™ N) | Naphthalene sulfonic acid-formaldehyde condensate | 20 | + | 36 | — |
| | | 50 | + | 40 | — |
| | | 100 | + | 36 | — |
| Tosoh US (SPINOMAR™ NaSS PS-1L) | P4SSA, Mw = 3.4k | 20 | + | 9 | — |
| | | 50 | + | 0 | — |
| | | 100 | + | 0 | — |
| Ex. 9 | P4SSA, Mw = 8.8k | 20 | + | 7.2 | — |
| | | 50 | + | 22 | — |
| Scientific Polymer Products (Cat# 407) | Poly(AMPS), 800k | 20 | + | 22 | — |
| | | 50 | + | 27 | Clear aq phase did not reach 18 mm. |
| Solvay | Sodium lignosulfonate | 500 | + | 36 | — |

[a]Sulfonated polymer added to R3 PLS prior to mixing with organic phase, unless indicated otherwise.
[b]+ Indicates performance better than the control. i.e. a dispersion band width of <45 mm.
– Indicates performance worse than the control. i.e. a dispersion band width of >45 mm.
[c]Sulfonated polymer added to mixed phases.

TABLE 19b

Evaluation of Sulfonated Polymers as Crud Mitigation Reagents Using Bench-Scale Stir Test, cont.[a]

| Source | Description | Active (mg/L) | Result[b] | Dispersion Band Width (mm) | Comment |
|---|---|---|---|---|---|
| Ex. 10a | Styrene-AMPS Copolymer (96% AMPS) | 20 | + | 27 | — |
| | | 50 | + | 9 | — |
| | | 100 | + | 9 | — |
| Ex. 10b | Styrene-AMPS Copolymer (83% AMPS) | 50 | + | 1.8 | Almost clean interface |
| | | 100 | + | 0 | Clean interface |
| | | 500 | + | 18 | Dispersion band, clear org. and clear aq phases |
| Ex. 10c | Styrene-AMPS Copolymer (14% AMPS) | 50 | – | 45 | Org. phase emulsified |
| | | 100 | – | N/A | Clear org. phase, solids and dispersion in aq phase, solids at interface, no settled solids |
| | | 500 | – | N/A | Clear org. phase, solids and dispersion in aq phase, solids at interface, no settled solids |
| | | 20 | – | >45 | Dispersion band |
| | | 50 | – | >45 | Dispersion band |
| | | 500 | – | >45 | Completely emulsified |
| Ex. 8g | SS:AMD Copolymer (63% AMD) | 50 | + | 5.4 | — |
| | | 100 | + | 0 | Scattered droplets at interface |

TABLE 19b-continued

Evaluation of Sulfonated Polymers as Crud Mitigation
Reagents Using Bench-Scale Stir Test, cont.[a]

| Source | Description | Active (mg/L) | Result[b] | Dispersion Band Width (mm) | Comment |
| --- | --- | --- | --- | --- | --- |
| Ex. 8f | SS:AMD Copolymer (94% AMD) | 50 | + | 5.4 | — |
|  |  | 100 | + | 0 | Scattered droplets at interface |
| Ex. 8e | SS:AMD Copolymer (77% AMD) | 50 | + | 5.4 | — |
|  |  | 100 | + | 0 | Scattered droplets at interface |
|  |  | 500 | + | 7.2 | Very fine droplets |

[a]Sulfonated polymer added to R3 PLS prior to mixing with organic phase, unless indicated otherwise.
[b]+ Indicates performance better than the control. i.e. a dispersion band width of <45 mm.
− Indicates performance worse than the control. i.e. a dispersion band width of >45 mm.

The invention may be embodied in many different forms and should not be construed as limited to the embodiments set forth herein; rather, these embodiments are provided so that this disclosure will satisfy applicable legal requirements. As used herein and in the appended claims, the singular forms include plural referents unless the context clearly dictates otherwise.

Those skilled in the art will appreciate that while preferred embodiments are discussed in detail above, multiple embodiments of the crud mitigation reagent and methods described herein are contemplated as being within the scope of the present invention. Thus, it should be noted that any feature described with respect to one aspect or one embodiment of the invention is interchangeable with an alternative aspect or embodiment of the invention unless otherwise stated. It will be understood by those skilled in the art that any description of the invention, even though described in relation to a specific embodiment or drawing, is applicable to and interchangeable with other embodiments of the invention.

Furthermore, for purposes of describing the present invention, where an element, component, or feature is said to be included in and/or selected from a list of recited elements, components, or features, those skilled in the art will appreciate that in the related embodiments of the invention described herein, the element, component, or feature can also be any one of the individual recited elements, components, or features, or can also be selected from a group including any two or more of the explicitly listed elements, components, or features. Additionally, any element, component, or feature recited in such a list may also be omitted from such list.

Those skilled in the art will further understand that any recitation herein of a numerical range by endpoints includes all numbers subsumed within the recited range (including fractions), whether explicitly recited or not, as well as the endpoints of the range and equivalents. Thus for example, "1 to 5" includes 1, 2, 3, 4, and 5 when referring to, for example, a number of elements, and can also include 1.5, 2, 2.75, and 3.8 when referring to, for example, measurements. Disclosure of a narrower range or more specific group in addition to a broader range or larger group is not a disclaimer of the broader range or larger group. All ranges disclosed herein are inclusive of the endpoints, and the endpoints are independently combinable with each other. For example, ranges of "up to 25 wt. %, or, more specifically, 5 wt. % to 20 wt. %", are inclusive of the endpoints and all intermediate values of the ranges, including "5 wt. % to 25 wt. %", etc.

The methods and compositions herein can alternatively comprise, consist of, or consist essentially of any appropriate steps or components separately disclosed herein. The methods and compositions can additionally, or alternatively, be formulated so as to be devoid, or substantially free, of any steps or materials that are otherwise not necessary to the achievement of the function or objectives of the methods and compositions.

"Combinations" is inclusive of blends, mixtures, alloys, reaction products, and the like. Any use of the terms "first", "second", and the like, do not denote any order, quantity, or importance, but rather are used to distinguish one element from another. "Or" means "and/or" unless clearly stated otherwise. "A and/or B" means "A, B, or a combination of A and B.

In a list of alternatively usable species, "a mixture thereof" means that the mixture can include a mixture of at least one element of the list with one or more like elements not named.

"At least one of" means that the list is inclusive of each element individually, as well as combinations of two or more elements of the list, and combinations of at least one element of the list with like elements not named.

Unless specified to the contrary herein, all test standards are the most recent standard in effect as of the filing date of this application, or, if priority is claimed, the filing date of the priority application.

Unless defined otherwise herein, technical and scientific terms used herein have the same meaning as is commonly understood by one of skill in the art to which this application belongs.

All cited patents, patent applications, and other references are incorporated herein by reference in their entirety. However, if a term in the present disclosure contradicts or conflicts with a term in the incorporated reference, the term from the present disclosure takes precedence over the conflicting term from the incorporated reference.

What is claimed is:

1. A hydrometallurgical solvent extraction method for preventing or mitigating crud within a solvent extraction circuit, the method comprising
 mixing, within a mixing vessel or extraction column of a solvent extraction circuit, an aqueous metal ion solution with an organic solution of metal extraction reagent capable of binding with metal ions and transferring the metal ions from the aqueous solution to the organic solution to form a mixture, and
 allowing the aqueous metal ion solution and organic solution to phase separate from the mixture;
 wherein prior to mixing the aqueous metal ion solution and the organic solution, and prior to or during crud formation, a water-soluble or water-dispersible polymer comprising pendant sulfonic acid or sulfonate salt groups selected from the group consisting of sulfonated polystyrene; an addition polymer comprising at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added to the aqueous metal ion solution, the organic solution, or to both the aqueous metal ion solution and the organic solution to prevent or mitigate crud formation within the mixing vessel, the extraction column and/or a settler after the mixing vessel, of the solvent extraction circuit.

2. The method of claim 1, wherein the water-soluble or water-dispersible polymer comprising pendant sulfonic acid or sulfonate salt groups is added to the aqueous metal ion solution.

3. The method of claim 1, wherein the aqueous metal ion solution is a pregnant leach solution, the organic solution is a partially loaded or barren organic solution, and the pregnant leach solution is extracted with the partially loaded or barren organic solution to generate a raffinate and a loaded organic solution.

4. The method of claim 1, wherein the aqueous metal ion solution is a recycled raffinate solution which has been separated from the organic solution.

5. The method of claim 1, wherein the aqueous metal ion solution is a lean aqueous electrolyte solution, and the loaded organic solution is stripped with the lean aqueous electrolyte solution to generate a rich aqueous electrolyte solution and a barren organic solution.

6. The method of claim 1, wherein the metal extraction reagent is dissolved in an organic solvent to form the organic solution, wherein the organic solvent comprises aromatic paraffins, aliphatic paraffins, naphthas, or a combination comprising at least one of the foregoing organic solvents.

7. The method of claim 1, wherein the water-soluble or water-dispersible polymer comprising pendant sulfonic acid or sulfonate salt groups comprises a sulfonated polystyrene with a degree of sulfonation of 1 to 100 mol %, based on the moles of styrene repeat units of polystyrene before sulfonation, salts thereof, or a combination comprising at least one of the foregoing water-soluble or water-dispersible polymers.

8. The method of claim 7, wherein the water-soluble or water-dispersible polymer is a sulfonated polystyrene or salt thereof having 65 to 95 mol % sulfonation, based on the moles of styrene repeat units of polystyrene before sulfonation.

9. The method of claim 7, wherein the sulfonated polystyrene or salt thereof has a number-average molecular weight of 300 to 100,000 g/mol and a polydispersity of 1 to 3, as measured by size exclusion chromatography against 100% sulfonated polystyrene standards.

10. The method of claim 9, wherein the sulfonated polystyrene or salt thereof has a number-average molecular weight of 500 to 10,000 g/mol, as measured by size exclusion chromatography against 100% sulfonated polystyrene standards.

11. The method of claim 1, wherein the water-soluble or water-dispersible polymer comprising pendant sulfonic acid or sulfonate salt groups is selected from the group consisting of poly(styrene-4-sulfonic acid); poly(2-acrylamido-2-methylpropane sulfonic acid); copolymers of 2-acrylamido-2-methylpropane sulfonic acid and acrylamide; copolymers of styrene-4-sulfonic acid and acrylamide; copolymers of styrene and 2-acrylamido-2-methylpropane sulfonic acid, wherein the amount of 2-acrylamido-2-methylpropane sulfonic acid is greater than or equal to 20 mole %; salts thereof; and mixtures thereof.

12. The method of claim 11, wherein the water-soluble or water-dispersible polymer comprising pendant sulfonic acid or sulfonate salt groups comprises poly(styrene-4-sulfonic acid), salts thereof, or mixtures thereof.

13. The method of claim 11, wherein the water-soluble or water-dispersible polymer comprising pendant sulfonic acid or sulfonate salt groups comprises poly(2-acrylamido-2-methylpropane sulfonic acid), salts thereof, or mixtures thereof.

14. The method of claim 11, wherein the water-soluble or water-dispersible polymer comprising pendant sulfonic acid or sulfonate salt groups comprises copolymers of 2-acrylamido-2-methylpropane sulfonic acid (AMPS) and acrylamide (AMD),
wherein the molar ratio of AMPS:AMD is from 30:70 to 90:10, salts thereof, or mixtures thereof.

15. The method of claim 14, wherein the molar ratio of AMPS:AMD is from 50:50 to 90:10.

16. The method of claim 11, wherein the water-soluble or water-dispersible polymer comprising pendant sulfonic acid or sulfonate salt groups comprises copolymers of 2-acrylamido-2-methylpropane sulfonic acid (AMPS) and styrene, wherein the molar ratio of AMPS is greater than 40%, salts thereof, or mixtures thereof.

17. The method of claim 16, wherein the molar ratio of AMPS is greater than 60%.

18. The method of claim 11, wherein the water-soluble or water-dispersible polymer comprising pendant sulfonic acid or sulfonate salt groups comprises copolymers of styrene-4-sulfonic acid (SS) and acrylamide (AMD), wherein the molar ratio of SS:AMD is from 30:70 to 90:10, salts thereof, or mixtures thereof.

19. The method of claim 18, wherein the molar ratio of SS:AMD is from 60:40 to 80:20.

20. The method of claim 11, wherein the water-soluble or water-dispersible polymer comprising pendant sulfonic acid or sulfonate salt groups comprises naphthalene sulfonic acid-formaldehyde condensate, salts thereof, or mixtures thereof.

21. The method of claim 11, wherein the water-soluble or water-dispersible polymer comprising pendant sulfonic acid or sulfonate salt groups comprises lignosulfonate, salts thereof, or mixtures thereof.

22. The method of claim 1, wherein the aqueous metal ion solution and organic solution are mixed in aqueous continuity.

23. The method of claim 1, wherein the aqueous metal ion solution and organic solution are mixed in organic continuity.

24. The method of claim 1, wherein the metal ion comprises copper, cadmium, chromium, cobalt, molybdenum, nickel, tin, uranium, vanadium, zinc, lithium, gold, a platinum group metal, an actinide, a rare earth element, or a combination comprising at least one of the foregoing metal ions.

25. The method of claim 1, wherein an amount of water-soluble or water-dispersible polymer added to the aqueous metal ion solution, the organic solution, or to both the aqueous metal ion solution and the organic solution, is 0.01 to 1,000 milligrams per liter (mg/L) of aqueous metal ion solution.

26. The method of claim 1, wherein an effective amount of the water-soluble or water-dispersible polymer comprising pendant sulfonic acid or sulfonate salt groups is added to the aqueous metal ion solution, the organic solution, or to both the aqueous metal ion solution and the organic solution, to reduce or prevent solid-stabilized emulsion formation compared to the same method without addition of the water-soluble or water-dispersible polymer is added.

27. The method of claim 26, wherein solid-stabilized emulsion formation is measured by the depth of the solid-stabilized emulsion layer.

28. The method of claim 26, wherein the effective amount of water-soluble or water-dispersible polymer added to the aqueous metal ion solution, the organic solution, or to both the aqueous metal ion solution and the organic solution, is 0.05 to 100 milligrams per liter (mg/L) of aqueous metal ion solution.

29. The method of claim 1, wherein an effective amount of the water-soluble or water-dispersible polymer comprising pendant sulfonic acid or sulfonate salt groups is added to the aqueous metal ion solution, the organic solution, or to both the aqueous metal ion solution and the organic solution, to reduce or prevent organic solution entrainment in the aqueous metal ion solution compared to the same method without addition of the water-soluble or water-dispersible polymer.

30. A hydrometallurgical solvent extraction method for preventing or mitigating crud within a solvent extraction circuit, the method comprising mixing, within a mixing vessel or extraction column of a solvent extraction circuit, an aqueous metal ion solution with an organic solution of metal extraction reagent capable of binding with metal ions and transferring the metal ions from the aqueous solution to the organic solution to form a mixture, and allowing the aqueous metal ion solution and organic solution to phase separate from the mixture; and wherein prior to or during crud formation, a water-soluble or water-dispersible polymer comprising pendant sulfonic acid or sulfonate salt groups selected from the group consisting of sulfonated polystyrene; an addition polymer comprising at least one of styrene-4-sulfonic acid and 2-acrylamido-2-methylpropane sulfonic acid; naphthalene sulfonic acid-formaldehyde condensate; lignosulfonate; salts thereof; and mixtures thereof, is added simultaneously with or after mixing of the aqueous metal ion solution and the organic solution to prevent or mitigate crud formation within the mixing vessel, the extraction column and/or a settler after the mixing vessel, of the solvent extraction circuit.

31. A hydrometallurgical solvent extraction method, the method comprising mixing an aqueous metal ion solution with an organic solution to form a mixture of metal extraction reagent capable of binding with metal ions and transferring the metal ions from the aqueous solution to the organic solution, and allowing the aqueous metal ion solution and organic solution to phase separate from the mixture;

wherein prior to mixing the aqueous metal ion solution and the organic solution, a sulfonated polystyrene or salt thereof having 65 to 95 mol % sulfonation, based on the moles of styrene repeat units, a number-average molecular weight of 500 to 10,000 g/mol, and a polydispersity of 1 to 3, as measured by size exclusion chromatography against 100% sulfonated polystyrene standards, is added to the aqueous metal ion solution.

* * * * *